(12) United States Patent
Jafarkhani et al.

(10) Patent No.: US 8,411,785 B2
(45) Date of Patent: Apr. 2, 2013

(54) METHOD AND APPARATUS FOR INTERFERENCE CANCELLATION AND DETECTION USING PRECODERS

(75) Inventors: Hamid Jafarkhani, Irvine, CA (US); Feng Li, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 217 days.

(21) Appl. No.: 13/103,940

(22) Filed: May 9, 2011

(65) Prior Publication Data

US 2012/0114056 A1 May 10, 2012

Related U.S. Application Data

(60) Provisional application No. 61/333,691, filed on May 11, 2010.

(51) Int. Cl.
*H04B 7/02* (2006.01)

(52) U.S. Cl. ....................................................... 375/267

(58) Field of Classification Search ........................ None
See application file for complete search history.

(56) References Cited

U.S. PATENT DOCUMENTS

| | | | | |
|---|---|---|---|---|
| 8,194,760 B2* | 6/2012 | Papadopoulos | ............... | 375/260 |
| 8,325,840 B2* | 12/2012 | Bursalioglu et al. | ........... | 375/267 |

OTHER PUBLICATIONS

Siavash Ekbatani and Hamid Jafarkhani, "Combining Beamforming and Space-Time Coding Using Quantized Feedback", IEEE Transactions on Wireless Communications, vol. 7, No. 3, Mar. 2008.*
Javad Kazemitabar and Hamid Jafarkhani, "Multiuser Interference Cancellation and Detection for Users with More Than Two Transmit Antennas", IEEE Transactions on Communications, vol. 56, No. 4, Apr. 2008.*
Javad Kazemitabar and Hamid Jafarkhani, "Performance Analysis of Multiple Antenna Multi-User Detection", IEEE Information Theory and Applications Workshop, Feb. 2009.*

* cited by examiner

*Primary Examiner* — Daniel Washburn
*Assistant Examiner* — Bahman Badipour
(74) *Attorney, Agent, or Firm* — Marcus C. Dawes; Daniel L. Dawes

(57) ABSTRACT

A method to achieve full diversity without sacrificing bandwidth and with a linear complexity in a wireless system includes the steps of orthogonally transmitting a plurality of signals utilizing multiple antennas using a corresponding plurality of precoders in a plurality of time slots, which precoders are designed using the channel information to cancel interference among the plurality of signals while achieving a maximum possible diversity of NM with low complexity for at least two users each having N transmit antennas and one receiver with M receive antennas, separating the signals in the receiver using the orthogonality of the transmitted signals, and decoding the signals independently to provide full diversity to the at least two users.

18 Claims, 5 Drawing Sheets

METHOD AND APPARATUS FOR INTERFERENCE CANCELLATION AND DETECTION USING PRECODERS

GOVERNMENT RIGHTS

This invention was made with Government Support under grant number W911NF-04-1-0224 of MURI/ARO. The Government has certain rights in this invention.

RELATED APPLICATIONS

The present application is related to U.S. Provisional Patent Application, Ser. No. 61/333,691, filed on May 11, 2010, which is incorporated herein by reference and to which priority is claimed pursuant to 35 USC 119.

BACKGROUND OF THE INVENTION

1. Field of the Invention

The invention relates to the field of wireless digital communication using an apparatus and a method that achieves full diversity and low complexity without sacrificing bandwidth and with a linear complexity.

2. Description of the Prior Art

Antenna diversity, also known as space diversity, is any one of several wireless diversity schemes that use two or more antennas to improve the quality and reliability of a wireless link. Often, especially in urban and indoor environments, there is no clear line-of-sight between transmitter and receiver. Instead the signal is reflected along multiple paths before finally being received. Each of these bounces can introduce phase shifts, time delays, attenuations, and distortions that can destructively interfere with one another at the aperture of the receiving antenna. Antenna diversity is especially effective at mitigating these multipath situations. This is because multiple antennas offer a receiver several observations of the same signal. Each antenna will experience a different interference environment. Thus, if one antenna is experiencing a deep fade, it is likely that another has a sufficient signal. Collectively such a system can provide a robust link. While this is primarily seen in receiving systems (diversity reception), the analog has also proven valuable for transmitting systems (transmit diversity) as well.

Inherently an antenna diversity scheme requires additional hardware and integration versus a single antenna system but due to the commonality of the signal paths a fair amount of circuitry can be shared. Also with the multiple signals there is a greater processing demand placed on the receiver, which can lead to tighter design requirements. Typically, however, signal reliability is paramount and using multiple antennas is an effective way to decrease the number of drop-outs and lost connections.

In the past, systems have been devised that have used time division multiple access (TDMA), frequency division multiple access (FDMA), code division multiple access (CDMA) or other multiple access methods to avoid interference. The disadvantage is the waste of bandwidth resources.

Another way to avoid interference is to use antenna resources at the receiver to cancel the interference. The disadvantage of this method is that it reduces the diversity and/or increases the complexity exponentially.

Multi-user detection schemes with simple receiver structures have been recently well studied. Multiple transmit and receive antennas have been used to increase rate and improve the reliability of wireless systems. In this disclosure, we consider a multiple-antenna multi-access scenario where receive antennas are utilized to cancel the interference. In the prior art multiple antennas have been used to suppress the interference from other users. It has been shown that one can decode each user separately by using a large enough number of receive antennas. More specifically, for J users equipped with N transmit antennas, it is known how to cancel the interference using N J receive antennas.

To reduce the number of required receive antennas, the prior art has provided an interference cancellation method for users with two-transmit antennas. The method is based on the properties of orthogonal space-time block codes (OSTBCs) and requires a smaller number of receive antennas, i.e. as many as the number of users. This work was extended to a higher number of transmit antennas but only for J=2 users. The common theme of the prior art is the utilization of the properties of the orthogonal designs at the transmitter to cancel the interference at the receiver. In communications, multiple-access schemes are orthogonal when an ideal receiver can completely reject arbitrarily strong unwanted signals using different basis functions than the desired signal. One such scheme is time division multiple access (TDMA), where the orthogonal basis functions are non-overlapping rectangular pulses ("time slots"). Another scheme is orthogonal frequency-division multiplexing (OFDM), which refers to the use, by a single transmitter, of a set of frequency multiplexed signals with the exact minimum frequency spacing needed to make them orthogonal so that they do not interfere with each other.

Unfortunately, the method does not work for a general case of complex constellations, N>2 transmit antennas, and J>2 users. In fact, such an extension using orthogonal designs is impossible. Instead, it has been suggested that a method based on quasi-orthogonal spacetime block codes (QOSTBCs) might be used. The main complexity tradeoff between OSTBCs and QOSTBCs is the symbol-by-symbol decoding versus pairwise decoding. Therefore, by a moderate increase of decoding complexity, the prior art has extended prior multi-user detection schemes to any constellation, any number of users, and any number of transmit antennas.

Further, it is known that for $M \geq J$ receive antennas, the diversity of each user is equal to NM using maximum-likelihood detection and N (M−J+1) using low-complexity array-processing schemes. Note that the complexity of the maximum-likelihood detection increases exponentially as a function of the number of antennas, the number of users, and the bandwidth efficiency (measured in bits per channel use). Therefore, usually it is not practical.

The common goal and the main characteristics of the above multi-user systems are the small number of required receive antennas and the low complexity of the array-processing decoding. A receiver does not need more than J receive antennas and the decoding is symbol-by-symbol or pairwise using low complexity array-processing methods. One drawback, however, is that if we demand low complexity, the maximum diversity of NM is not achievable.

BRIEF SUMMARY OF THE INVENTION

The illustrated embodiment of the invention is the first method devised that achieves full diversity without sacrificing bandwidth and with a linear complexity. One advantage is full diversity and low complexity. The illustrated embodiments of the invention can be used in existing and future wireless communication systems and networks. It can simplify the design of MAC layer as there is no need to avoid interference, instead we cancel the effects of the interference. The illustrated embodiments of the invention are expected to be used in existing and next generation wireless communications systems. It can be adopted for any TDMA/CDMA wireless communication system and network with multiple antennas, such those using IEEE 802.11n, IEEE 802.16e, IEEE 802.20, 4G, and WiMax standards. Any company in the wireless communication industry could employ the illustrated embodiments of the invention. The defense industry can also benefit from the illustrated embodiments of the invention.

In one embodiment we consider interference cancellation for a system with two users when users know each other's channels. The goal is to utilize multiple antennas to cancel the interference without sacrificing the diversity or the complexity of the system. Before, in the literature, it was shown how a receiver with two receive antennas can completely cancel the interference of two users and provide a diversity of 2 for users with two transmit antennas. In this embodiment we propose a system to achieve the maximum possible diversity of 4 with low complexity. One idea is to design precoders, using the channel information, to make it possible for different users to transmit over orthogonal spaces. Then, using the orthogonality of the transmitted signals, the receiver can separate them and decode the signals independently. We analytically prove that the system provides full diversity to both users. In addition, we provide simulation results that confirm our analytical proof.

The goal in the illustrated embodiments is to utilize the channel information to cancel the interference without sacrificing the diversity or the complexity of the system. We have proposed a system to achieve the maximum possible diversity of N M with low complexity for two users each with N transmit antennas and one receiver with M receive antennas. This is the first multiuser detection scheme that achieves full diversity while providing a linear low complexity decoding. Using precoders designed using the channel information, it makes it possible for different users to transmit over orthogonal spaces. Then, using the orthogonality of the transmitted signals, the receiver can separate them and decode the signals independently. We have analytically proven that the system provides full diversity to both users. In addition, we provide simulation results that confirm our analytical results.

Our motivation is to utilize the channel information at the user transmitters to increase the diversity of the system while keeping the low complexity of the decoding. In other words, unlike the above-mentioned methods, we do not use receive antennas to cancel the interference. Instead, we use the channel information at the transmitter to design precoders that align different groups of signals along orthogonal directions. As a result, interference suppression is achieved without utilizing the receive antenna resources and therefore full diversity is achieved naturally.

In the illustrated embodiments for the purposes of illustration, we consider interference cancellation for a system with two users when users know each other channels. The goal is to utilize multiple antennas to cancel the interference without sacrificing the diversity or the complexity of the system. It is well known in the art how a receiver with two receive antennas can completely cancel the interference of two users and provide a diversity of 2 for users with two transmit antennas. The disclosed system achieves the maximum possible diversity of 4 with low complexity. With the disclosed designed precoders, using the channel information, to make it possible for different users to transmit over orthogonal spaces. Then, using the orthogonality of the transmitted signals, the receiver can separate them and decode the signals independently. We analytically show that the system provides full diversity to both users. Simulation confirms the analytical proof.

In the illustrated embodiments we disclose a scheme for two users each with two transmit antennas. The illustrated embodiments achieve interference cancellation and full diversity for each user at the same time. We show that the example then can be extended to two users each with more than two transmit antennas. We also extend the results to more than two receive antennas.

Boldface letters are used to denote matrices and vectors, super-scripts $(\ )^T$, $(.)^H$ to denote the transpose and Hermitian, respectively. We denote the element in the ith row and the jth column of matrix Z by $Z(i, j)$. Also, we denote the jth column of a matrix Z by $Z(j)$. The real and imaginary parts of a scalar z are denoted by $z_R$ and $z_I$, respectively.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

In FIG. 3, we compare two users each equipped with two transmit antennas and a receiver with two receive antennas. We compare our results with the prior art results using quadrature phase-shift keying (QPSK) for the same configuration without channel information at the transmitter.

In FIG. 4 we compare two users each equipped with four transmit antennas and a receiver with two receive antennas. We compare our results with the prior art results using quasi-orthogonal space-time block code (QOSTBC) for the same configuration without channel information at the transmitter.

In FIG. 5 we compare two users each equipped with two transmit antennas and a receiver with two and also with three receive antennas. We compare our results with the prior art results using QOSTBC for the same configuration without channel information at the transmitter.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
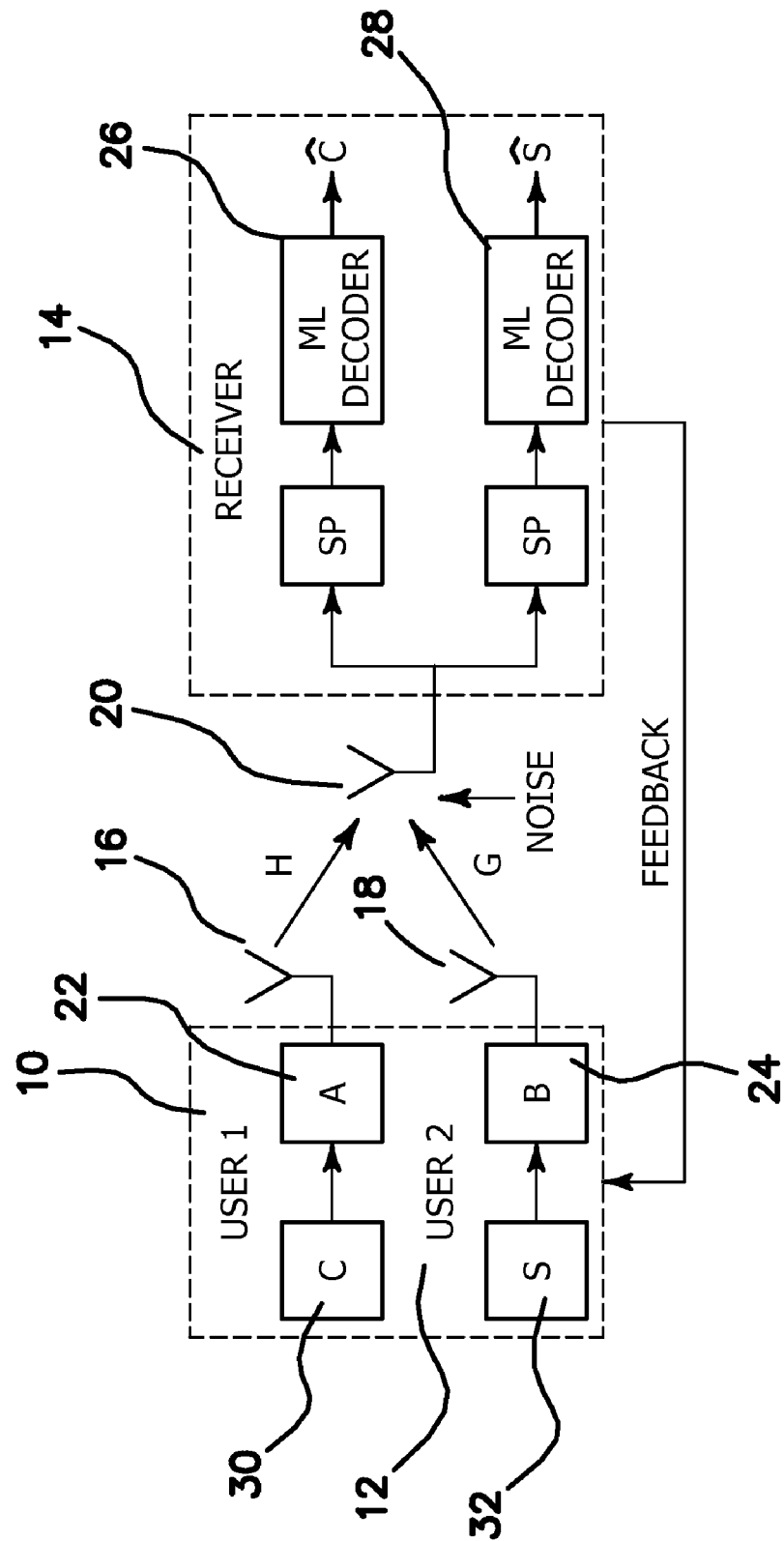
FIG. 1 is a block diagram showing two users, two users orthogonally transmitting codewords, C and S, through two precoders, A and B, by means of at least two antennas each to a receiver with at least two antennas.

In illustrated embodiments, we assume a quasi-static flat Rayleigh fading channel model for the channel as shown in FIG. 1. Rayleigh fading is a statistical model for the effect of a propagation environment on a radio signal, such as that used by wireless devices. Rayleigh fading models assume that the magnitude of a signal that has passed through such a transmission medium (also called a communications channel) will vary randomly, or fade, according to a Rayleigh distribution, i.e. the radial component of the sum of two uncorrelated Gaussian random variables. Rayleigh fading is viewed as a reasonable model for tropospheric and ionospheric signal propagation as well as the effect of heavily built-up urban environments on radio signals. Rayleigh fading is most applicable when there is no dominant propagation along a line of sight between the transmitter and receiver.

The path gains are independent complex Gaussian random variables and fixed during the transmission of one block. There are two users 10, 12, who send code words 30 and 32, (C, S), each with two transmit antennas 16, 18 (the two pairs of antennas shown in the figure symbolically be a single antenna symbol each) communicating over corresponding channels G and H with one receiver 14 with two receive antennas 20 (the pair of antennas shown in the figure symbolically be a single antenna symbol) with two corresponding signal processors 34, 36 (SP) coupled to two corresponding maximum likelihood (ML) decoders 26, 28.

At the first two time slots, the channel matrices for Users 1 and 2 are:

$$H = \begin{pmatrix} h_{11} & h_{12} \\ h_{21} & h_{22} \end{pmatrix}, \quad (1)$$

$$G = \begin{pmatrix} g_{11} & g_{12} \\ g_{21} & g_{22} \end{pmatrix}$$

respectively, where $h_{ij}$ and $g_{ij}$ are independent and identically distributed complex numbers with mean 0 and variance 1.

At the first two time slots, Users 1 and 2 transmit Alamouti codes $$C = \begin{pmatrix} c_1 & -c_2^* \\ c_2 & c_1^* \end{pmatrix}, \quad (2)$$

$$S = \begin{pmatrix} s_1 & -s_2^* \\ s_2 & s_1^* \end{pmatrix}$$

respectively from transmitters 30, 32 in FIG. 1. At time slots 1 and 2, the received signals are respectively denoted by $$y^1 = \begin{pmatrix} y_1^1 \\ y_2^1 \end{pmatrix}, \quad (3)$$

$$y^2 = \begin{pmatrix} y_1^2 \\ y_2^2 \end{pmatrix}$$

We assume that the transmitter and receiver know the channel information perfectly.

Let $$A^1 = \begin{pmatrix} a_{11}^1 & a_{12}^1 \\ a_{21}^1 & a_{22}^1 \end{pmatrix}, \quad (4)$$

$$A^2 = \begin{pmatrix} a_{11}^2 & a_{12}^2 \\ a_{21}^2 & a_{22}^2 \end{pmatrix}$$

denote the precoders 22 of User 1 at time slots 1 and 2, respectively. Also, $$B^1 = \begin{pmatrix} b_{11}^1 & b_{12}^1 \\ b_{21}^1 & b_{22}^1 \end{pmatrix}, \quad (5)$$

$$B^2 = \begin{pmatrix} b_{11}^2 & b_{12}^2 \\ b_{21}^2 & b_{22}^2 \end{pmatrix}$$

denote the precoders 24 of User 2 at time slots 1 and 2, respectively.

Our goal is to design low-complexity precoders 22, 24 to realize interference cancellation and full diversity for each user. The main idea is to design precoders 22, 24 such that the two users transmit over two orthogonal spaces. As a result, the decoders 26, 28 can project the received signals to each of the orthogonal spaces and decode the information of each user without any interference from the other user. Later, we prove that the resultant diversity is full for each user.

We first present the precoder design for time slot 1. Then, a similar design strategy for time slot 2 is briefly discussed. We present our precoder design method through the following four steps:

Step 1: Deriving the Equivalent Channel Equations:

At time slot 1, the signal model can be written as $$y^1 = \sqrt{E_s} HA^1 \begin{pmatrix} c_1 \\ c_2 \end{pmatrix} + \sqrt{E_s} GB^1 \begin{pmatrix} s_1 \\ s_2 \end{pmatrix} + W^1 \quad (6)$$

At time slot 2, we have $$y^2 = \sqrt{E_s} HA^2 \begin{pmatrix} -c_2^* \\ c_1^* \end{pmatrix} + \sqrt{E_s} GB^2 \begin{pmatrix} -s_2^* \\ s_1^* \end{pmatrix} + W^2 \quad (7)$$

where $E_S$ denotes the total transmit energy of each user and $$W^1 = \begin{pmatrix} n_1^1 \\ n_2^1 \end{pmatrix},$$

$$W^2 = \begin{pmatrix} n_1^2 \\ n_2^2 \end{pmatrix}$$

Denote the noise at the receiver at time slots 1 and 2, respectively. We assume that $n_1^1, n_2^1, n_1^2, n_2^2$ are independent and identically distributed complex Gaussian noises with mean 0 and variance 1. If we let $$\hat{H}^1 = \begin{pmatrix} \hat{h}^1_{11} & \hat{h}^1_{12} \\ \hat{h}^1_{21} & \hat{h}^1_{22} \end{pmatrix} = HA^1 \qquad (8)$$

$$= \begin{pmatrix} h_{11}a^1_{11} + h_{12}a^1_{21} & h_{11}a^1_{12} + h_{12}a^1_{22} \\ h_{21}a^1_{11} + h_{22}a^1_{21} & h_{21}a^1_{12} + h_{22}a^1_{22} \end{pmatrix}$$

$$\hat{G}^1 = \begin{pmatrix} \hat{g}^1_{11} & \hat{g}^1_{12} \\ \hat{g}^1_{21} & \hat{g}^1_{22} \end{pmatrix} = GB^1 \qquad (9)$$

$$= \begin{pmatrix} g_{11}b^1_{11} + g_{12}b^1_{21} & g_{11}b^1_{12} + g_{12}b^1_{22} \\ g_{21}b^1_{11} + g_{22}b^1_{21} & g_{21}b^1_{12} + g_{22}b^1_{22} \end{pmatrix}$$

$$\hat{H}^2 = \begin{pmatrix} \hat{h}^2_{11} & \hat{h}^2_{12} \\ \hat{h}^2_{21} & \hat{h}^2_{22} \end{pmatrix} = HA^2 \qquad (10)$$

$$= \begin{pmatrix} h_{11}a^2_{11} + h_{12}a^2_{21} & h_{11}a^2_{12} + h_{12}a^2_{22} \\ h_{21}a^2_{11} + h_{22}a^2_{21} & h_{21}a^2_{12} + h_{22}a^2_{22} \end{pmatrix}$$

$$\hat{G}^2 = \begin{pmatrix} \hat{g}^2_{11} & \hat{g}^2_{12} \\ \hat{g}^2_{21} & \hat{g}^2_{22} \end{pmatrix} = GB^2 \qquad (11)$$

$$= \begin{pmatrix} g_{11}b^2_{11} + g_{12}b^2_{21} & g_{11}b^2_{12} + g_{12}b^2_{22} \\ g_{21}b^2_{11} + g_{22}b^2_{21} & g_{21}b^2_{12} + g_{22}b^2_{22} \end{pmatrix}$$

then channel equations (6) and (7) can be written as $$\begin{pmatrix} y^1_1 \\ y^1_2 \end{pmatrix} = \sqrt{E_s} \begin{pmatrix} \hat{h}^1_{11} & \hat{h}^1_{12} \\ \hat{h}^1_{21} & \hat{h}^1_{22} \end{pmatrix} \begin{pmatrix} c_1 \\ c_2 \end{pmatrix} + \sqrt{E_s} \begin{pmatrix} \hat{g}^1_{11} & \hat{g}^1_{12} \\ \hat{g}^1_{21} & \hat{g}^1_{22} \end{pmatrix} \begin{pmatrix} s_1 \\ s_2 \end{pmatrix} + \begin{pmatrix} n^1_1 \\ n^1_2 \end{pmatrix} \qquad (12)$$

$$\begin{pmatrix} y^2_1 \\ y^2_2 \end{pmatrix} = \sqrt{E_s} \begin{pmatrix} \hat{h}^2_{11} & \hat{h}^2_{12} \\ \hat{h}^2_{21} & \hat{h}^2_{22} \end{pmatrix} \begin{pmatrix} -c^*_2 \\ c^*_1 \end{pmatrix} + \sqrt{E_s} \begin{pmatrix} \hat{g}^2_{11} & \hat{g}^2_{12} \\ \hat{g}^2_{21} & \hat{g}^2_{22} \end{pmatrix} \begin{pmatrix} -s^*_2 \\ s^*_1 \end{pmatrix} + \begin{pmatrix} n^2_1 \\ n^2_2 \end{pmatrix} \qquad (13)$$

Combining equations (12) and (13), we have $$\begin{pmatrix} y^1_1 \\ y^1_2 \\ (y^2_1)^* \\ (y^2_2)^* \end{pmatrix} = \sqrt{E_s} \begin{pmatrix} \hat{h}^1_{11} & \hat{h}^1_{12} & \hat{g}^1_{11} & \hat{g}^1_{12} \\ \hat{h}^1_{21} & \hat{h}^1_{22} & \hat{g}^1_{21} & \hat{g}^1_{22} \\ (\hat{h}^2_{12})^* & -(\hat{h}^2_{11})^* & (\hat{g}^2_{12})^* & -(\hat{g}^2_{11})^* \\ (\hat{h}^2_{22})^* & -(\hat{h}^2_{21})^* & (\hat{g}^2_{22})^* & -(\hat{g}^2_{21})^* \end{pmatrix} \begin{pmatrix} c_1 \\ c_2 \\ s_1 \\ s_2 \end{pmatrix} + \begin{pmatrix} n^1_1 \\ n^1_2 \\ (n^2_1)^* \\ (n^2_2)^* \end{pmatrix} \qquad (14)$$

Equation (14) is the equivalent channel equation and we define $$\tilde{H} = \begin{pmatrix} \hat{h}^1_{11} & \hat{h}^1_{12} & \hat{g}^1_{11} & \hat{g}^1_{12} \\ \hat{h}^1_{21} & \hat{h}^1_{22} & \hat{g}^1_{21} & \hat{g}^1_{22} \\ (\hat{h}^2_{12})^* & -(\hat{h}^2_{11})^* & (\hat{g}^2_{12})^* & -(\hat{g}^2_{11})^* \\ (\hat{h}^2_{22})^* & -(\hat{h}^2_{21})^* & (\hat{g}^2_{22})^* & -(\hat{g}^2_{21})^* \end{pmatrix}, \qquad (15)$$

$$\tilde{n} = \begin{pmatrix} n^1_1 \\ n^1_2 \\ (n^2_1)^* \\ (n^2_2)^* \end{pmatrix}$$

Figure 2:
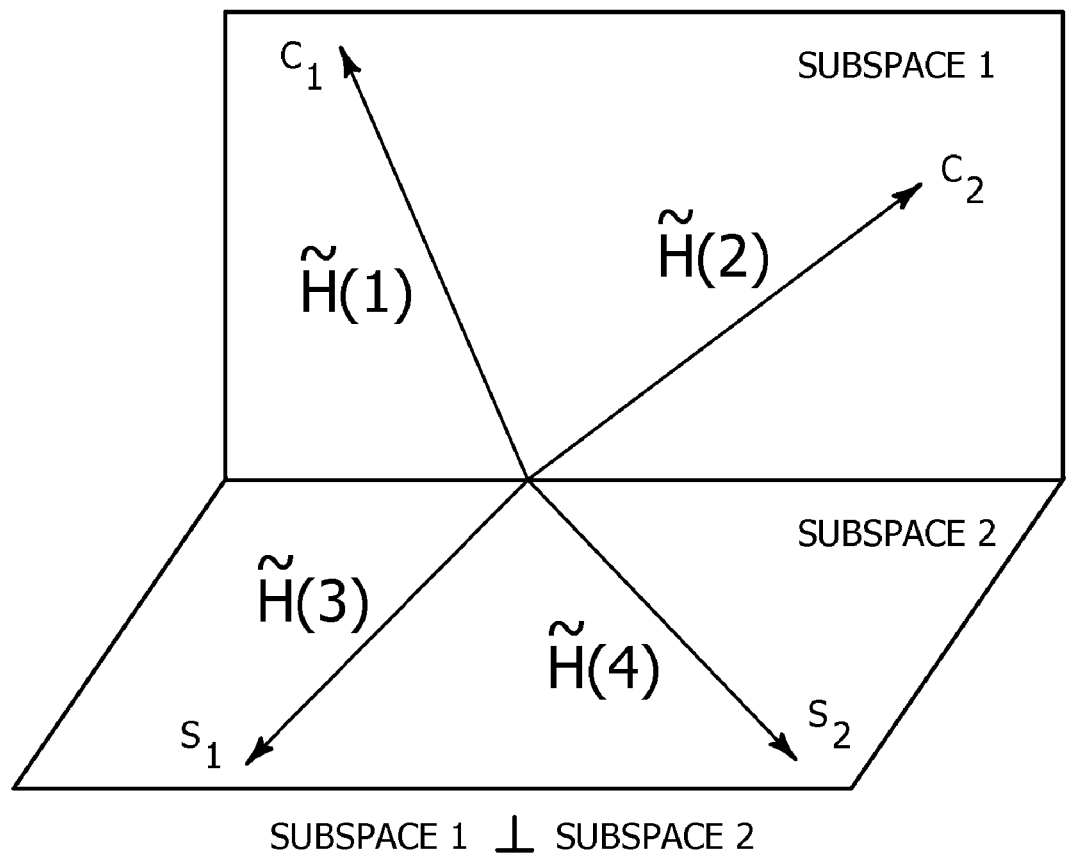
FIG. 2 is a diagram illustrating the quasi orthogonal space in which the signals are transmitted.

Step 2: Creating the Orthogonal Structure of Signal Vectors:

We aim to align signals along several orthogonal vectors to separate them completely. From Equation (14), we know that we have four useful symbols of the two users. If we can transmit them along four orthogonal vectors, it is clear that we can separate them easily at the receiver. But we know that a four dimensional complex orthogonal design does not exist. So we can utilize a quasi-orthogonal design. In other words, we can make the subspace 1 created by the first two columns of matrix $\tilde{H}$ orthogonal to the subspace 2 created by the second two columns of matrix $\tilde{H}$ as shown in FIG. 2. Then at the receiver 14, we can separate the signals of User 1 from the signals of User 2.

In order to create the quasi-orthogonal structure, first, we let $$A^1(1) = A^1(2), A^2(1) = A^2(2) \qquad (16)$$

$$B^1(1) = B^1(2), B^2(2) \qquad (17)$$

That is $$\begin{pmatrix} a^1_{11} \\ a^1_{21} \end{pmatrix} = \begin{pmatrix} a^1_{12} \\ a^1_{22} \end{pmatrix}, \begin{pmatrix} a^2_{11} \\ a^2_{21} \end{pmatrix} = \begin{pmatrix} a^2_{12} \\ a^2_{22} \end{pmatrix} \qquad (18)$$

$$\begin{pmatrix} b^1_{11} \\ b^1_{21} \end{pmatrix} = \begin{pmatrix} b^1_{12} \\ b^1_{22} \end{pmatrix}, \begin{pmatrix} b^2_{11} \\ b^2_{21} \end{pmatrix} = \begin{pmatrix} b^2_{12} \\ b^2_{22} \end{pmatrix} \qquad (19)$$

From Equations (8), (9), (18), (19), we can derive $$\begin{pmatrix} \hat{h}^1_{11} \\ \hat{h}^1_{21} \end{pmatrix} = \begin{pmatrix} \hat{h}^1_{12} \\ \hat{h}^1_{22} \end{pmatrix}, \begin{pmatrix} (\hat{h}^2_{12})^* \\ (\hat{h}^2_{22})^* \end{pmatrix} = \begin{pmatrix} (\hat{h}^2_{11})^* \\ (\hat{h}^2_{21})^* \end{pmatrix} \qquad (20)$$

$$\begin{pmatrix} \hat{g}^1_{11} \\ \hat{g}^1_{21} \end{pmatrix} = \begin{pmatrix} \hat{g}^1_{12} \\ \hat{g}^1_{22} \end{pmatrix}, \begin{pmatrix} (\hat{g}^2_{12})^* \\ (\hat{g}^2_{22})^* \end{pmatrix} = \begin{pmatrix} (\hat{g}^2_{11})^* \\ (\hat{g}^2_{21})^* \end{pmatrix}$$

For simplicity, equation (14) can be written as $$\begin{pmatrix} y^1_1 \\ y^1_2 \\ (y^2_1)^* \\ (y^2_2)^* \end{pmatrix} = \sqrt{E_s} \begin{pmatrix} \hat{h}^1_{11} & \hat{h}^1_{11} & \hat{g}^1_{11} & \hat{g}^1_{11} \\ \hat{h}^1_{21} & \hat{h}^1_{21} & \hat{g}^1_{21} & \hat{g}^1_{21} \\ (\hat{h}^2_{12})^* & -(\hat{h}^2_{12})^* & (\hat{g}^2_{12})^* & -(\hat{g}^2_{12})^* \\ (\hat{h}^2_{22})^* & -(\hat{h}^2_{22})^* & (\hat{g}^2_{22})^* & -(\hat{g}^2_{22})^* \end{pmatrix} \begin{pmatrix} c_1 \\ c_2 \\ s_1 \\ s_2 \end{pmatrix} + \tilde{n} \qquad (21)$$

Now, we let $$\begin{pmatrix} \hat{g}^1_{11} \\ \hat{g}^1_{21} \end{pmatrix} = \eta_1 \begin{pmatrix} -(\hat{h}^1_{21})^* \\ (\hat{h}^1_{11})^* \end{pmatrix}, \begin{pmatrix} (\hat{g}^2_{12})^* \\ (\hat{g}^2_{22})^* \end{pmatrix} = \eta_2 \begin{pmatrix} -\hat{h}^2_{22} \\ \hat{h}^2_{12} \end{pmatrix} \qquad (22)$$

where $\eta_1$ and $\eta_2$ are parameters we will determine later. Therefore, equation (21) can be written as $$\begin{pmatrix} y_1^1 \\ y_2^1 \\ (y_1^2)^* \\ (y_2^2)^* \end{pmatrix} = \sqrt{E_s} \begin{pmatrix} \hat{h}_{11}^1 & \hat{h}_{11}^1 & -\eta_1(\hat{h}_{21}^1)^* & -\eta_1(\hat{h}_{21}^1)^* \\ \hat{h}_{21}^1 & \hat{h}_{21}^1 & -\eta_1(\hat{h}_{21}^1)^* & -\eta_1(\hat{h}_{21}^1)^* \\ (\hat{h}_{12}^2)^* & -(\hat{h}_{12}^2)^* & -\eta_2\hat{h}_{22}^2 & \eta_2\hat{h}_{22}^2 \\ (\hat{h}_{22}^2)^* & -(\hat{h}_{22}^2)^* & \eta_2\hat{h}_{12}^2 & -\eta_2\hat{h}_{12}^2 \end{pmatrix} \begin{pmatrix} c_1 \\ c_2 \\ s_1 \\ s_2 \end{pmatrix} + \tilde{n} \quad (23)$$

Note that, four symbols are transmitted along four columns of matrix $\tilde{H}$ The first two columns are orthogonal to the second two columns. So $c_1$, $c_2$ and $s_1$, $s_2$ are transmitted in two orthogonal subspaces as shown in FIG. 2. In this way, we can separate them and achieve interference cancellation for each user at the receiver 14.

Step 3: Designing Low-complexity Algorithms to Calculate the Parameters in the Precoders 22, 24:

In order to get the quasi-orthogonal structure given in equation (23), equation (22) shows that we need to solve the following equations $$\begin{pmatrix} g_{11}^* & g_{12}^* \\ g_{21}^* & g_{22}^* \end{pmatrix} \begin{pmatrix} (b_{11}^1)^* \\ (b_{21}^1)^* \end{pmatrix} = \eta_1 \begin{pmatrix} -h_{21} & -h_{22} \\ h_{11} & h_{12} \end{pmatrix} \begin{pmatrix} a_{11}^1 \\ a_{21}^1 \end{pmatrix} \quad (24)$$

$$\begin{pmatrix} g_{11}^* & g_{12}^* \\ g_{21}^* & g_{22}^* \end{pmatrix} \begin{pmatrix} (b_{12}^2)^* \\ (b_{22}^2)^* \end{pmatrix} = \eta_2 \begin{pmatrix} -h_{21} & -h_{22} \\ h_{11} & h_{12} \end{pmatrix} \begin{pmatrix} a_{12}^2 \\ a_{22}^2 \end{pmatrix} \quad (25)$$

with the normalization conditions of the precoders 22, 24 represented by $$|a_{11}^1|^2 + |a_{21}^1|^2 = |b_{11}^1|^2 + |b_{21}^1|^2 = \frac{1}{2} \quad (26)$$

$$|a_{12}^2|^2 + |a_{22}^2|^2 = |b_{12}^2|^2 + |b_{22}^2|^2 = \frac{1}{2} \quad (27)$$

where we have used equations (18) and (19). Note that equations (26) and (27) are non-linear equations, if numerical algorithms are used to solve these equations directly, the encoding complexity will be increased exponentially with respect to the number of users and antennas. So we need to find a low-complexity method to determine the precoder parameters. First, we consider equations (24) and (26).

From equation (24), we have $$\begin{pmatrix} (b_{11}^1)^* \\ (b_{21}^1)^* \end{pmatrix} = \eta_1 \begin{pmatrix} g_{11}^* & g_{12}^* \\ g_{21}^* & g_{22}^* \end{pmatrix}^{-1} \begin{pmatrix} -h_{21} & -h_{22} \\ h_{11} & h_{12} \end{pmatrix} \begin{pmatrix} a_{11}^1 \\ a_{21}^1 \end{pmatrix} \quad (28)$$

Let $$Q = \begin{pmatrix} g_{11}^* & g_{12}^* \\ g_{21}^* & g_{22}^* \end{pmatrix}^{-1} \begin{pmatrix} -h_{21} & -h_{22} \\ h_{11} & h_{12} \end{pmatrix} \quad (29)$$

By equations (26) and (28), we have $$|b_{11}^1|^2 + |b_{21}^1|^2 = \left\| \eta_1 Q \begin{pmatrix} a_{11}^1 \\ a_{21}^1 \end{pmatrix} \right\|_F^2 = \frac{1}{2} \quad (30)$$

Now, let us consider the singular value decomposition of matrix Q, i.e., $$Q = U\Sigma V^H = U\text{diag}(\lambda_1, \lambda_2) V^H \quad (31)$$

where U and V are unitary matrices and $\Sigma$ is a diagonal matrix with nonnegative diagonal elements $\{\lambda_1, \lambda_2\}$ in decreasing order. Replacing equation (31) in equation (30) results in $$\left\| \eta_1 U\Sigma V^H \times \begin{pmatrix} a_{11}^1 \\ a_{21}^1 \end{pmatrix} \right\|_F^2 = \frac{1}{2} \quad (32)$$

We know that multiplying by a unitary matrix does not change the norm of a vector, so we have $$\left\| \eta_1 \Sigma V^H \times \begin{pmatrix} a_{11}^1 \\ a_{21}^1 \end{pmatrix} \right\|_F^2 = \frac{1}{2} \quad (33)$$

Then defining $$\begin{pmatrix} x_1 \\ x_2 \end{pmatrix} = V^H \times \begin{pmatrix} a_{11}^1 \\ a_{21}^1 \end{pmatrix} \quad (34)$$

and replacing it in equation (33) results in $$\left\| \eta_1 \sum \begin{pmatrix} x_1 \\ x_2 \end{pmatrix} \right\|_F^2 = \eta_1^2 \lambda_1^2 |x_1|^2 + \eta_1^2 \lambda_2^2 |x_2|^2 = \frac{1}{2} \quad (35)$$

Since $V^H$ is unitary, by equations (34) and (26), we have $$x_1^2 + x_2^2 = |a_{11}^1|^2 + |a_{21}^1|^2 = \frac{1}{2}. \quad (36)$$

If we let $\bar{x}_1 = x^2{}_1$, $\bar{x}_2 = x^2{}_2$, then we can replace the nonlinear equations (24), (26) by the following two linear equations:

$$\lambda_1^2 \bar{x}_1 + \lambda_2^2 \bar{x}_2 = \frac{1}{2\eta_1^2} \quad (37)$$

$$\bar{x}_1 + \bar{x}_2 = \frac{1}{2} \quad (38)$$

In the next step, we will choose the precoder parameters satisfying equations (37) and (38). Note that. the computational complexity of solving these linear equations is very low compared with that of solving equations (24), (26).

Step 4: Choosing the Precoder Parameters:

Note that in Equations (37) and (38), the number of unknown parameters is more than the number of equations. Therefore, the solution to achieve interference-cancellation and full diversity for each user is not unique. Different solutions may lead to different coding gains and different complexity. Our emphasis in the illustrated embodiment is on low complexity. So we do not claim that our choice has the best-coding gain. In what follows, first we choose $\eta_1$.

At the first time slot, we choose $\eta_1 = 1/\lambda_1$. Then equations (37) and (38) become $$\lambda_1^2 \bar{x}_1 + \lambda_2^2 \bar{x}_2 = \frac{1}{2} \lambda_1^2 \quad (39)$$

$$\bar{x}_1 + \bar{x}_2 = \frac{1}{2} \quad (40)$$

It is easy to derive $\bar{x}_1 = 1/2$, $\bar{x}_2 = 0$. By equation (34), we have $$\begin{pmatrix} a_{11}^1 \\ a_{21}^1 \end{pmatrix} = V \times \begin{pmatrix} \frac{1}{\sqrt{2}} \\ 0 \end{pmatrix} = \frac{1}{\sqrt{2}} V(1) \quad (41)$$

Then, by equation (28), we have $$\begin{pmatrix} (b_{11}^1)^* \\ (b_{21}^1)^* \end{pmatrix} = \eta_1 Q \begin{pmatrix} a_{11}^1 \\ a_{21}^1 \end{pmatrix} \quad (42)$$

$$= \frac{1}{\lambda_1} U \sum V^H V \times \begin{pmatrix} \frac{1}{\sqrt{2}} \\ 0 \end{pmatrix}$$

$$= \frac{1}{\sqrt{2}} U(1)$$

Finally, by equation (20), we can determine the precoders $A^1$ for User 1 and $B^1$ for User 2 completely at time slot 1 as follows $$A^1 = \frac{1}{\sqrt{2}} [V(1), V(1)], \quad (43)$$

$$B^1 = \frac{1}{\sqrt{2}} [U(1), U(1)]^*$$

At time slot 2, we need to solve equations (25) and (27). By the same method used for time slot 1, we can arrive at $$\lambda_1^2 \bar{x}_1 + \lambda_2^2 \bar{x}_2 = \frac{1}{2\eta_2^2} \quad (44)$$

$$\bar{x}_1 + \bar{x}_2 = \frac{1}{2} \quad (45)$$

Then we choose $\eta_2 = 1/\lambda_2$. Replacing $\eta_2$ in equations (44) and (45) results in $$\lambda_1^2 \bar{x}_1 + \lambda_2^2 \bar{x}_2 = \frac{1}{2} \lambda_2^2 \quad (46)$$

$$\bar{x}_1 + \bar{x}_2 = \frac{1}{2} \quad (47)$$

It is easy to derive $\bar{x}_1 = 0$, $\bar{x}_2 = 1/2$. So we have $$\begin{pmatrix} a_{12}^2 \\ a_{22}^2 \end{pmatrix} = V \times \begin{pmatrix} 0 \\ \frac{1}{\sqrt{2}} \end{pmatrix} = \frac{1}{\sqrt{2}} V(2) \quad (48)$$

and $$\begin{pmatrix} (b_{12}^2)^* \\ (b_{22}^2)^* \end{pmatrix} = \eta_2 Q \begin{pmatrix} a_{12}^2 \\ a_{22}^2 \end{pmatrix} \quad (49)$$

$$= \frac{1}{\lambda_2} U \sum V^H V \times \begin{pmatrix} 0 \\ \frac{1}{\sqrt{2}} \end{pmatrix}$$

$$= \frac{1}{\sqrt{2}} U(2)$$

Finally, by equation (20), we can determine the precoders $A^2$ for User 1 and $B^2$ for User 2 completely at time slot 2 as follows $$A^2 = \frac{1}{\sqrt{2}} [V(2), V(2)], \quad (50)$$

$$B^2 = \frac{1}{\sqrt{2}} [U(2), U(2)]^*$$

So far, we have designed the precoders for both users through the above four steps when the channel information is known at the transmitter.

Decoding

Consider now decoding. We start with equation (21). Note that equation (21) can also be written as $$\begin{pmatrix} y_1^1 \\ (y_1^2)^* \\ y_2^1 \\ (y_2^2)^* \end{pmatrix} = \sqrt{E_s} \begin{pmatrix} \hat{h}_{11}^1 & \hat{h}_{11}^1 & \hat{g}_{11}^1 & \hat{g}_{11}^1 \\ (\hat{h}_{12}^2)^* & -(\hat{h}_{12}^2)^* & (\hat{g}_{12}^2)^* & -(\hat{g}_{12}^2)^* \\ \hat{h}_{21}^1 & \hat{h}_{21}^1 & \hat{g}_{21}^1 & \hat{g}_{21}^1 \\ (\hat{h}_{22}^2)^* & -(\hat{h}_{22}^2)^* & (\hat{g}_{22}^2)^* & -(\hat{g}_{22}^2)^* \end{pmatrix} \begin{pmatrix} c_1 \\ c_2 \\ s_1 \\ s_2 \end{pmatrix} + \begin{pmatrix} n_1^1 \\ (n_1^2)^* \\ n_2^1 \\ (n_2^2)^* \end{pmatrix} \quad (51)$$

and we define $$\bar{H} = \begin{pmatrix} \bar{H}_1 & \bar{G}_1 \\ \bar{H}_2 & \bar{G}_2 \end{pmatrix} = \begin{pmatrix} \hat{h}_{11}^1 & \hat{h}_{11}^1 & \hat{g}_{11}^1 & \hat{g}_{11}^1 \\ (\hat{h}_{12}^2)^* & -(\hat{h}_{12}^2)^* & (\hat{g}_{12}^2)^* & (\hat{g}_{12}^2)^* \\ \hat{h}_{21}^1 & \hat{h}_{21}^1 & \hat{g}_{21}^1 & \hat{g}_{21}^1 \\ (\hat{h}_{22}^2)^* & -(\hat{h}_{22}^2)^* & (\hat{g}_{22}^2)^* & -(\hat{g}_{22}^2)^* \end{pmatrix}, \quad (52)$$

$$\bar{n} = \begin{pmatrix} n_1^1 \\ (n_1^2)^* \\ n_2^1 \\ (n_2^2)^* \end{pmatrix}$$

where $$\overline{H}_1 = \begin{pmatrix} \hat{h}_{11}^1 & \hat{h}_{11}^1 \\ (\hat{h}_{12}^2)^* & -(\hat{h}_{12}^2)^* \end{pmatrix}, \quad (53)$$

$$\overline{G}_1 = \begin{pmatrix} \hat{g}_{11}^1 & \hat{g}_{11}^1 \\ (\hat{g}_{12}^2)^* & -(\hat{g}_{12}^2)^* \end{pmatrix},$$

$$\overline{H}_2 = \begin{pmatrix} \hat{h}_{21}^1 & \hat{h}_{21}^1 \\ (\hat{h}_{22}^2)^* & -(\hat{h}_{22}^2)^* \end{pmatrix},$$

$$\overline{G}_2 = \begin{pmatrix} \hat{g}_{21}^1 & \hat{g}_{21}^1 \\ (\hat{g}_{22}^2)^* & -(\hat{g}_{22}^2)^* \end{pmatrix},$$

Note that $\overline{H}$ has a quasi-orthogonal structure, i.e., the first two columns are orthogonal to the second two columns. If we multiply both sides of equation (51) with $\overline{H}^\dagger$ we will have $$\overline{H}^\dagger \begin{pmatrix} y_1^1 \\ (y_1^2)^* \\ y_2^1 \\ (y_2^2)^* \end{pmatrix} = \sqrt{E_s} \begin{pmatrix} \overline{H}_1^\dagger \overline{H}_1 + \overline{H}_2^\dagger \overline{H}_2 & 0 \\ 0 & \overline{G}_1^\dagger \overline{G}_1 + \overline{G}_2^\dagger \overline{G}_2 \end{pmatrix} \begin{pmatrix} c_1 \\ c_2 \\ s_1 \\ s_2 \end{pmatrix} + \overline{H}^\dagger \overline{n} \quad (54)$$

Now we define $$\tilde{y} = \begin{pmatrix} \tilde{y}_1 \\ \tilde{y}_2 \end{pmatrix} = \overline{H}^\dagger \begin{pmatrix} y_1^1 \\ (y_1^2)^* \\ y_2^1 \\ (y_2^2)^* \end{pmatrix} \quad (55)$$

where $$\tilde{y}_1 = \begin{pmatrix} \tilde{y}(1,1) \\ \tilde{y}(2,1) \end{pmatrix}, \tilde{y}_2 = \begin{pmatrix} \tilde{y}(3,1) \\ \tilde{y}(4,1) \end{pmatrix}.$$

Note that the noise elements of $\overline{H}^\dagger \overline{n}$ are correlated with covariance matrix $\overline{H}^\dagger \overline{H}$.

We can whiten this noise vector by multiplying both sides of equation (55) by the matrix $\overline{H}^\dagger \overline{H}^{(-1/2)}$ as follows $$(\overline{H}^\dagger \overline{H})^{-\frac{1}{2}} \tilde{y} = \sqrt{E_s} (\overline{H}^\dagger \overline{H})^{\frac{1}{2}} \begin{pmatrix} c_1 \\ c_2 \\ s_1 \\ s_2 \end{pmatrix} + \hat{n} \quad (56)$$

where n=has uncorrelated elements $\sim CN(0,1)$. If we define $$\hat{H} = \overline{H}_1^\dagger \overline{H}_1 + \overline{H}_2^\dagger \overline{H}_2 \quad (57)$$

$$\hat{G} = \overline{G}_1^\dagger \overline{G}_1 + \overline{G}_2^\dagger \overline{G}_2 \quad (58)$$

$$\hat{n} = \begin{pmatrix} \hat{n}_1 \\ \hat{n}_2 \end{pmatrix}, \hat{n}_1 = \begin{pmatrix} \hat{n}(1,1) \\ \hat{n}(2,1) \end{pmatrix}, \hat{n}_2 = \begin{pmatrix} \hat{n}(3,1) \\ \hat{n}(4,1) \end{pmatrix} \quad (59)$$

Then equation (56) is equivalent to the following two equations $$\hat{H}^{-\frac{1}{2}} \tilde{y}_1 = \sqrt{E_s} \hat{H}^{\frac{1}{2}} \begin{pmatrix} c_1 \\ c_2 \end{pmatrix} + \hat{n}_1 \quad (60)$$

$$\hat{G}^{-\frac{1}{2}} \tilde{y}_2 = \sqrt{E_s} \hat{G}^{\frac{1}{2}} \begin{pmatrix} s_1 \\ s_2 \end{pmatrix} + \hat{n}_2 \quad (61)$$

So we can realize interference cancellation and pairwise complex symbol decoding for each user. If instead of complex symbols, we use real symbols, we can achieve symbol-by-symbol decoding using orthogonal designs.

When quadrature amplitude modulation (QAM) is adopted, we show that we can further reduce the decoding complexity as follows. Note that for 2×2 complex matrix $$Z = \begin{pmatrix} \alpha & \alpha \\ \beta & -\beta \end{pmatrix}, Z^\dagger Z = \begin{pmatrix} |\alpha|^2 + |\beta|^2 & |\alpha|^2 - |\beta|^2 \\ |\alpha|^2 - |\beta|^2 & |\alpha|^2 + |\beta|^2 \end{pmatrix},$$

which is a real matrix. So matrices H and G in equations (60), (61) are all real matrices. Then equations (60), (61) are equivalent to the following four equations $$\hat{H}^{-\frac{1}{2}} \text{real}\{\tilde{y}_1\} = \sqrt{E_s} \hat{H}^{\frac{1}{2}} \begin{pmatrix} c_{1R} \\ c_{2R} \end{pmatrix} + \text{real}\{\hat{n}_1\} \quad (62)$$

$$\hat{H}^{-\frac{1}{2}} \text{Imag}\{\tilde{y}_1\} = \sqrt{E_s} \hat{H}^{\frac{1}{2}} \begin{pmatrix} c_{1I} \\ c_{2I} \end{pmatrix} + \text{Imag}\{\hat{n}_1\} \quad (63)$$

$$\hat{G}^{-\frac{1}{2}} \text{real}\{\tilde{y}_2\} = \sqrt{E_s} \hat{G}^{\frac{1}{2}} \begin{pmatrix} s_{1R} \\ s_{2R} \end{pmatrix} + \text{real}\{\hat{n}_2\} \quad (64)$$

$$\hat{G}^{-\frac{1}{2}} \text{Imag}\{\tilde{y}_2\} = \sqrt{E_s} \hat{G}^{\frac{1}{2}} \begin{pmatrix} s_{1I} \\ s_{2I} \end{pmatrix} + \text{Imag}\{\hat{n}_2\} \quad (65)$$

where real $\{z\}$, Imag $\{z\}$ denote the real and imaginary parts of vector z, respectively. So we can use the maximum-likelihood method to detect $(c_{1R}, c_{2R})$, $(c_{1I}, c_{2I})$, $(s_{1R}, s_{2R})$, $(s_{1I}, s_{2I})$ separately. For example, by equation (62), we can detect $(c_{1R}, c_{2R})$ by $$\hat{c}_{1R}, \hat{c}_{2R} = \arg\min_{c_{1R}, c_{2R}} \left\| \hat{H}^{-\frac{1}{2}} \text{real}\{\tilde{y}_1\} - \sqrt{E_s} \hat{H}^{\frac{1}{2}} \begin{pmatrix} c_{1R} \\ c_{2R} \end{pmatrix} \right\|_F^2 \quad (66)$$

Similarly, using equations (63), (64), (65), we can detect all other codewords.

Full Diversity

Diversity is usually defined as the exponent of the ratio of probability of error to the signal-to-noise-ratio (SNR) as the SNR becomes very large or goes to infinity. In other words, theoretically as the noise in a signal goes toward zero, the probability of error in the digital communication becomes very small and approaches a limit called the diversity of the system. Mathematically, the diversity order can be defined as $$d = -\lim_{\rho \to \infty} \frac{\log P_e}{\log \rho} \quad (67)$$

where p denotes the SNR and $P_e$ represents the probability of error. We first consider equation (62). Here we add a real unitary rotation R to $(c_{1R}, c_{2R})$. Thus, the data vector $$d = R\begin{pmatrix} c_{1R} \\ c_{2R} \end{pmatrix}$$

and we define the error matrix $D=d-\bar{d}$. By equation (62), the pairwise error probability (PEP) can be given by the Gaussian tail function as $$P(d \to \bar{d} \mid \hat{H}) = Q\left(\sqrt{\frac{\rho}{8} \frac{\|\hat{H}^{\frac{1}{2}} RD\|_F^2}{4N_0}}\right) \quad (68)$$

where $N_0 = \frac{1}{2}$ is the variance of the elements of the white noise vector real$\{\hat{n}_1\}$ in equation (62). Now we assume $\bar{H}_1$ and $\bar{H}_2$ have the following singular value decompositions $$\bar{H}_1 = U_1 \Lambda_1 V_1 = U_1 \text{diag}\{\lambda_{11}, \lambda_{12}\} V_1 \quad (69)$$

$$\bar{H}_2 = U_2 \Lambda_2 V_2 = U_2 \text{diag}\{\lambda_{21}, \lambda_{22}\} V_2 \quad (70)$$

So $\bar{H}_1^\dagger \bar{H}_1 = V_1^T \Lambda_1^2 V_1, \bar{H}_2^\dagger \bar{H}_2 = V_2^T \Lambda_2^2 V_2$.

Since $\bar{H}_1^t \bar{H}_1$ and $\bar{H}_2^t \bar{H}_2$ are both block-circulant matrices, $$V_1 = V_2 = \frac{1}{\sqrt{2}} \begin{pmatrix} 1 & 1 \\ 1 & -1 \end{pmatrix}$$

We let $$\tilde{V}_1 = \tilde{V}_2 = \begin{pmatrix} 1 & 1 \\ 1 & -1 \end{pmatrix}$$

and $$\tilde{\Lambda}_1 = \frac{1}{\sqrt{2}} \Lambda_1 = \text{diag}\{\tilde{\lambda}_{11}, \tilde{\lambda}_{12}\},$$

$$\tilde{\Lambda}_2 = \frac{1}{\sqrt{2}} \Lambda_2 = \text{diag}\{\tilde{\lambda}_{21}, \tilde{\lambda}_{22}\}.$$

Therefore, equation (68) can be written as $$P(d \to \bar{d} \mid \hat{H}) = Q\left(\sqrt{\frac{\rho[D^T R^T \tilde{V}_1^T (\tilde{\Lambda}_1^2 + \tilde{\Lambda}_2^2) \tilde{V}_1 RD]}{16}}\right) \quad (71)$$

By replacing $$\Phi = \tilde{V}_1 RD$$

in equation (71), we have $$P(d \to \bar{d} \mid \hat{H}) = Q\left(\sqrt{\frac{\rho \sum_{i=1}^{2} \sum_{j=1}^{2} \Phi(j,1)^2 |\tilde{\lambda}_{i,j}|^2}{16}}\right) \quad (72)$$

Using the inequality $Q(x) \leq \frac{1}{2} \exp(-x^2/2)$ results in $$P(d \to \bar{d} \mid \hat{H}) \leq \frac{1}{2} \exp\left(-\frac{\rho \sum_{i=1}^{2} \sum_{j=1}^{2} \Phi(j,1)^2 |\tilde{\lambda}_{i,j}|^2}{32}\right) \quad (73)$$

Now we evaluate the distribution of $\Lambda_{ij}$. We know that $$\bar{H}_1 = U_1 \begin{pmatrix} \bar{\lambda}_{11} & 0 \\ 0 & \bar{\lambda}_{12} \end{pmatrix} \begin{pmatrix} 1 & 1 \\ 1 & -1 \end{pmatrix}, \quad (74)$$

$$\bar{H}_2 = U_2 \begin{pmatrix} \bar{\lambda}_{21} & 0 \\ 0 & \bar{\lambda}_{22} \end{pmatrix} \begin{pmatrix} 1 & 1 \\ 1 & -1 \end{pmatrix}$$

Therefore, $$\begin{pmatrix} \bar{\lambda}_{11} \\ \bar{\lambda}_{12} \end{pmatrix} = U_1^\dagger \bar{H}_1(1) \text{ and } \begin{pmatrix} \bar{\lambda}_{21} \\ \bar{\lambda}_{22} \end{pmatrix} = U_2^\dagger \bar{H}_2(1).$$

By equations (53), (8) and (10), we know that conditioned on V, each element of $\bar{H}_1(1)$ and $\bar{H}_2(1)$ will be independent and identically distributed complex-Gaussian random variables with mean 0 and variance 1. Multiplying by unitary matrices $U^\dagger_1$ and $U^\dagger_2$ does not change the distribution. So $\tilde{\lambda}_{11}$, $\tilde{\lambda}_{12}$, $\tilde{\lambda}_{21}$, $\tilde{\lambda}_{22}$ are all independent and identically distributed complex Gaussian random variables with mean 0 and variance 1. Their magnitudes, $|\tilde{\lambda}_{i,j}|^2$, are Rayleigh with the probability density function $$f(|\tilde{\lambda}_{i,j}|) = 2|\tilde{\lambda}_{i,j}| \exp(-|\tilde{\lambda}_{i,j}|^2).$$

Using the distribution of $|\tilde{\lambda}_{i,j}|^2$, we have $$P(d \to \bar{d}) = E[P(d \to \bar{d} \mid \hat{H})] \quad (75)$$

$$= E_V[E_{\hat{H}}[P(d \to \bar{d} \mid \hat{H})] \mid V]$$

$$\leq E_V\left[E_{\hat{H}}\left[\frac{1}{2}\exp\left(-\frac{\rho \sum_{i=1}^{2} \sum_{j=1}^{2} |\Phi(j,1)|^2 |\tilde{\lambda}_{i,j}|^2}{32}\right)\right] \mid V\right]$$

$$= E_V\left[\frac{1}{\prod_{j=1}^{2}[1 + (\rho|\Phi(j,1)|^2/32)]^2} \mid V\right]$$

$$= \frac{1}{\prod_{j=1}^{2}[1 + (\rho|\Phi(j,1)|^2/32)]^2}$$

At high SNRs, one can neglect the one in the denominator and get $$P(d \to \bar{d} \mid \hat{H}) \leq \left(\frac{\rho}{32}\right)^{-4} \prod_{j=1}^{2} |\Phi(j,1)|^{-4} \quad (76)$$

By equation (67), it can be shown that the diversity is 4 if we choose a proper unitary rotation matrix R such that $$\Pi_{j=1}^{2} |\Phi(j,1)| \neq 0.$$

The best known rotations for QAM to maximize the minimum product distance are provided in E. Bayer-Fluckiger, F. Oggier, and E. Viterbo, "New algebraic constructions of rotated $Z^n$•lattice constellations for the Rayleigh fading channel," *IEEE Trans. Inform. Theory*. vol. 50, pp. 702-714, April 2004. Similarly, we can also prove that the diversity for $(c_{1I}, c_{2I})$, $(s_{1R}, s_{2R})$, $(s_{1I}, s_{2I})$ are all 4. Therefore, the illustrated embodiment can achieve full diversity for each user. When a general constellation instead of QAM is adopted, similar techniques can be used to show that the system achieves full diversity using equation (60).

Consider now an extension of the illustrated embodiment to two users with more than two transmit antennas. Assume we have two users each with N=2n transmit antennas. At the first N time slots, Users 1 and 2 send code words $$C = \begin{pmatrix} -c_1 & c_1 & \ldots & c_1 \\ c_2 & -c_2 & \ldots & c_2 \\ \vdots & \vdots & \ddots & \vdots \\ c_N & c_N & \ldots & -c_N \end{pmatrix}, \tag{77}$$

$$S = \begin{pmatrix} -s_1 & s_1 & \ldots & s_1 \\ s_2 & -s_2 & \ldots & s_2 \\ \vdots & \vdots & \ddots & \vdots \\ s_N & s_N & \ldots & -s_N \end{pmatrix}$$

respectively. The received signals at time slot i, i=1, ..., N, are denoted by $$y^i = \begin{pmatrix} y_1^i \\ y_2^i \end{pmatrix} \tag{78}$$

Within these N time slots, the channel matrices for Users 1 and 2 are $$H = \begin{pmatrix} h_{11} & h_{12} & \ldots & h_{1N} \\ h_{21} & h_{22} & \ldots & h_{2N} \end{pmatrix}, \tag{79}$$

$$G = \begin{pmatrix} g_{11} & g_{12} & \cdots & g_{1N} \\ g_{21} & g_{22} & \cdots & g_{2N} \end{pmatrix}$$

respectively. At time slot i, i=1, ..., N, the precoders for Users 1 and 2 are $$A^i = \begin{pmatrix} a_{11}^i & a_{12}^i & \ldots & a_{1N}^i \\ a_{21}^i & a_{22}^i & \ldots & a_{2N}^i \\ \vdots & \vdots & \ddots & \vdots \\ a_{N1}^i & a_{N2}^i & \ldots & a_{NN}^i \end{pmatrix}, \tag{80}$$

$$B^i = \begin{pmatrix} b_{11}^i & b_{12}^i & \ldots & b_{1N}^i \\ b_{21}^i & b_{22}^i & \ldots & b_{2N}^i \\ \vdots & \vdots & \ddots & \vdots \\ b_{N1}^i & b_{N2}^i & \ldots & b_{NN}^i \end{pmatrix}$$

respectively. We follow the steps disclosed above to design the precoders.

Step 1: Deriving the Equivalent Channel Equations:
At time slot i, the signal model can be written as $$\begin{aligned} y^i &= \sqrt{E_s}\, HA^i C(i) + \sqrt{E_s}\, GB^i S(i) + W^i \\ &= \sqrt{E_s}\, \hat{H}^i C(i) + \sqrt{E_s}\, \hat{G}^i S(i) + W^i \end{aligned} \tag{81}$$

where $\hat{H}^i$ and $\hat{G}^i$ denote the equivalent channel matrices for Users 1 and 2 at time slot i, respectively. Combining channel equations at the first N time slots, we have $$\begin{pmatrix} y_1^1 \\ y_2^1 \\ y_1^2 \\ y_2^2 \\ \vdots \\ y_1^N \\ y_2^N \end{pmatrix} = \sqrt{E_s} \tag{82}$$

$$\begin{pmatrix} -\hat{H}^1(1) & \hat{H}^1(2) & \ldots & \hat{H}^1(N) & -\hat{G}^1(1) & \hat{G}^1(2) & \ldots & \hat{G}^1(N) \\ \hat{H}^2(1) & -\hat{H}^2(2) & \ldots & \hat{H}^2(N) & \hat{G}^2(1) & -\hat{G}^2(2) & \ldots & \hat{G}^2(N) \\ \vdots & \vdots & \ddots & \vdots & \vdots & \vdots & \ddots & \vdots \\ \hat{H}^N(1) & \hat{H}^N(2) & \ldots & -\hat{H}^N(N) & \hat{G}^N(1) & \hat{G}^N(2) & \ldots & -\hat{G}^N(N) \end{pmatrix}$$

$$\begin{pmatrix} c_1 \\ c_2 \\ \vdots \\ c_N \\ s_1 \\ s_2 \\ \vdots \\ s_N \end{pmatrix} + \begin{pmatrix} n_1^1 \\ n_2^1 \\ n_1^2 \\ n_2^2 \\ \vdots \\ n_1^N \\ n_2^N \end{pmatrix}$$

Here we let $$\tilde{H} = \tag{83}$$

$$\begin{pmatrix} -\hat{H}^1(1) & \hat{H}^1(2) & \ldots & \hat{H}^1(N) & -\hat{G}^1(1) & \hat{G}^1(2) & \ldots & \hat{G}^1(N) \\ \hat{H}^2(1) & -\hat{H}^2(2) & \ldots & \hat{H}^2(N) & \hat{G}^2(1) & -\hat{G}^2(2) & \ldots & \hat{G}^2(N) \\ \vdots & \vdots & \ddots & \vdots & \vdots & \vdots & \ddots & \vdots \\ \hat{H}^N(1) & \hat{H}^N(2) & \ldots & -\hat{H}^N(N) & \hat{G}^N(1) & \hat{G}^N(2) & \ldots & -\hat{G}^N(N) \end{pmatrix}$$

Step 2: Creating the Orthogonal Structure of Signal Vectors:
Let $$A^i(1) = A^i(2) = A^i(3) = \ldots = A^i(N) \tag{84}$$

$$B^i(1) = B^i(2) = B^i(3) = \ldots = B^i(N) \tag{85}$$

Equations (84) and (85) will result in $$\hat{H}^i(1) = \hat{H}^i(2) = \ldots = \hat{H}^i(N) \tag{86}$$

$$\hat{G}^i(1) = \hat{G}^i(2) = \ldots = \hat{G}^i(N) \tag{87}$$

respectively. In order to make the symbols of Users 1 and 2 transmitted in two orthogonal subspaces, i.e., the first N columns of $\tilde{H}$ are orthogonal to the second N columns of $\tilde{H}$, we let $$\begin{pmatrix} \hat{G}^i(1,1) \\ \hat{G}^i(2,1) \end{pmatrix} = \eta_i \begin{pmatrix} -\hat{H}^i(2,1) \\ \hat{H}^i(1,1) \end{pmatrix}^* \quad (88)$$

Step 3: Designing Low-Complexity Algorithms to Calculate the Parameters of the Precoders:

From equation (88), we have $$\begin{pmatrix} g_{11} & g_{12} & \cdots & g_{1N} \\ g_{21} & g_{22} & \cdots & g_{2N} \end{pmatrix}^* \begin{pmatrix} b_{11}^i \\ b_{21}^i \\ \vdots \\ b_{N1}^i \end{pmatrix}^* = \eta_i \begin{pmatrix} -h_{21} & -h_{22} & \cdots & -h_{2N} \\ h_{11} & h_{12} & \cdots & h_{1N} \end{pmatrix} \begin{pmatrix} a_{11}^i \\ a_{21}^i \\ \vdots \\ a_{N1}^i \end{pmatrix} \quad (89)$$

with nonnalization equations $$|a_{11}^i|^2 + |a_{21}^i|^2 + \ldots + |a_{N1}^i|^2 = \frac{1}{N} \quad (90)$$

$$|b_{11}^i|^2 + |b_{21}^i|^2 + \ldots + |b_{N1}^i|^2 = \frac{1}{N}$$

Note that the channel matrices in equation (89) are not square matrices. Therefore, we cannot use the reverse matrix directly as we did for the users with two transmit antennas above. Instead, in order to simplify the precoder design, at the first two time slots, we let all the elements in complex vector $$a^i = (a_{11}^i a_{21}^i \ldots a_{N1}^i)^T, i=1,2 \quad (91)$$

be zero except for the first two elements and also let all the elements in $$b^i = (b_{11}^i b_{21}^i \ldots b_{N1}^i)^T, i=1,2 \quad (92)$$

be zero except for the first two elements. By the above choices for $a^i$ and $b^i$, Equation (89) results in $$\begin{pmatrix} g_{11} & g_{12} \\ g_{21} & g_{22} \end{pmatrix}^* \begin{pmatrix} b_{11}^i \\ b_{21}^i \end{pmatrix}^* = \eta_i \begin{pmatrix} -h_{21} & -h_{22} \\ h_{11} & h_{12} \end{pmatrix} \begin{pmatrix} a_{11}^i \\ a_{21}^i \end{pmatrix} \quad (93)$$

which is exactly the same as equation (28). Following the steps disclosed above, Equations (90) and (93) result in $$\lambda_1^2 |x_1|^2 + \lambda_2^2 |x_2|^2 = \frac{1}{N} \cdot \frac{1}{\eta^2} \quad (94)$$

$$|x_1|^2 + |x_2|^2 = \frac{1}{N}$$

Step 4: Choosing the Precoder Parameters:

At time slot 1, we choose $\eta=1/\lambda_1$. It can be shown $$\begin{pmatrix} x_1 \\ x_2 \end{pmatrix} = \frac{1}{\sqrt{N}} \begin{pmatrix} 1 \\ 0 \end{pmatrix}, \quad (95)$$

$$\begin{pmatrix} a_{11}^1 \\ a_{21}^1 \end{pmatrix} = \frac{1}{\sqrt{N}} V(1)$$

At time slot 2, we choose $\eta=1/\lambda_2$, that results in $$\begin{pmatrix} x_1 \\ x_2 \end{pmatrix} = \frac{1}{\sqrt{N}} \begin{pmatrix} 0 \\ 1 \end{pmatrix}, \quad (96)$$

$$\begin{pmatrix} a_{11}^1 \\ a_{21}^1 \end{pmatrix} = \frac{1}{\sqrt{N}} V(2)$$

where V comes from the singular value decomposition in equation (31).

At time slots 3 and 4, the precoder design procedures are nearly the same as that of the first two time slots. The only difference is that, we let all the elements be zero except the second two elements in both $a^i$ and $b^i$, i=3, 4, in order to get a square matrix like that in equation (93). Then we follow the same steps to determine the precoders at time slots 3 and 4. We repeat the same process, by shifting the window of two nonzero elements, until all precoders at all time slots are designed. This completes our extension to more than two transmit antennas. For the sake of brevity, we do not include the decoding and the proof of full diversity. They are similar in nature to what we presented earlier for users with two transmit antennas.

Consider now the extension of the illustrated embodiment to more than two receive antennas. So far, we have proposed a scheme for two users each with N transmit antennas and one receiver with two receive antennas. Now, we consider the case of M>2 receive antennas. First, note that if M=2m and N=nM, where m, n are positive integrals, our approach used above will still work if we adjust the dimension of the transmitted signals, the received signals, and the channel matrices.

Second, for other cases, we show that the disclosed embodiment combined with antenna selection can also achieve interference cancellation and full diversity for each user. In other words, extra antennas will provide extra diversity and the resulting diversity of the system is NM.

For the sake of simplicity, we consider two users each with two transmit antennas and one receiver with three receive antennas. The approach for a general case of N transmit and M receive antennas is similar. Our approach is to select two of the three receive antennas and use the method disclosed above for the selected antennas.

Consider the selection criterion. Note that by using the embodiment disclosed above, as shown in equation (73), the term that determines diversity is $$\Sigma_{i=1}^2 \Sigma_{j=1}^2 \Phi(j,1)^2 |\tilde{\lambda}_{i,j}|^2.$$

We know $$\Phi = \tilde{V}_1 RD = |\Phi(1,1), \Phi(2,1)|^T$$

where $\tilde{V}_1$ is constant and D is the error matrix. For a given constellation, the unitary rotation matrix R is chosen optimally and is fixed. So we can always find $$\phi_1 = \min_{\forall d^i, d^j} |\Phi(1,1)|, i \neq j.$$

and $$\phi_2 = \min_{\forall d^i, d^j} |\Phi(1,2)|, i \neq j.$$

Now we define $$\Phi = \Sigma_{i=1}^2 \Sigma_{j=1}^2 |\phi_j|^2 |\tilde{\lambda}_{i,j}|^2.$$

Different choice of receive antennas will lead to different $\tilde{\lambda}_{i,j}$ and thus different $\phi$. To pick two out of three antennas, we have three choices. We call the scenario that receive antennas 1 and 2 are chosen as Case 1, the scenario that receive antennas 2 and 3 are chosen as Case 2, and, the scenario that receive antennas 1 and 3 are chosen as Case 3. The corresponding $\phi$ for each case is given $$\phi_k = \sum_{i=1}^{2} \sum_{j=1}^{2} |\phi_j|^2 |\tilde{\lambda}_{ij}^k|^2, k=1,2,3.$$

Our selection criterion is to pick the two receive antennas of Case i whose corresponding $\phi_i$ is the largest among all the three cases. In other words, if $\phi_1 = \max(\phi_1, \phi_2, \phi_3)$, then we choose the two antennas corresponding to Case i. Obviously, by this method, we can achieve interference cancellation for each user.

We first present the proof for User 1. Let us assume the channel for User 1 is $$H = \begin{pmatrix} h_{11} & h_{12} \\ h_{21} & h_{22} \\ h_{31} & h_{32} \end{pmatrix}.$$

The channels for User 1 in Cases 1, 2, 3 are $$H_1 = \begin{pmatrix} h_{11} & h_{12} \\ h_{21} & h_{22} \end{pmatrix},$$

$$H_2 = \begin{pmatrix} h_{11} & h_{12} \\ h_{31} & h_{32} \end{pmatrix}, \text{ and}$$

$$H_3 = \begin{pmatrix} h_{21} & h_{22} \\ h_{31} & h_{32} \end{pmatrix},$$

respectively. Without loss of generality, let us assume $$i = \arg\max\{\phi_1, \phi_2, \phi_3\} \in \{1,2,3\}$$

and the two receive antennas in case i are selected. By our selection criterion, we know that $$\frac{\varphi_1 + \varphi_2 + \varphi_3}{3} \le \varphi_i \le \varphi_1 + \varphi_2 + \varphi_3 \quad (97)$$

where $$\phi_i = |\phi_1|^2 (|\tilde{\lambda}_{11}^i|^2 + |\phi_2|^2 (|\tilde{\lambda}_{12}^i|^2 + |\tilde{\lambda}_{22}^i|^2) \quad (98)$$

Now, let us define $$\delta_1 = |\phi_1|^2(|\tilde{\lambda}_{11}^1|^2 + |\tilde{\lambda}_{21}^1|^2 + |\tilde{\lambda}_{21}^2|^2) + |\phi_2|^2(|\tilde{\lambda}_{12}^1|^2 + |\tilde{\lambda}_{22}^1|^2 + |\tilde{\lambda}_{22}^2|^2) \quad (99)$$

$$\delta_2 = |\phi_1|^2(|\tilde{\lambda}_{11}^3|^2 + |\tilde{\lambda}_{21}^3|^2 + |\tilde{\lambda}_{11}^2|^2) + |\phi_2|^2 + |\tilde{\lambda}_{22}^3|^2 + |\tilde{\lambda}_{12}^2|^2) \quad (100)$$

Note that $$\delta_1 + \delta_2 = \sigma_1 + \sigma_2 + \sigma_3,$$

then by equation (97), it can be shown that $$\frac{2 \cdot \min\{\delta_1, \delta_2\}}{3} \le \varphi_i \le 2 \cdot \max\{\delta_1, \delta_2\} \quad (101)$$

which results in $$P(d \to \bar{d} \mid \hat{H}) \le \quad (102)$$

$$\frac{1}{2}\exp\left(-\frac{\rho\left(\Phi(1,1)^2\left(|\tilde{\lambda}_{11}^i|^2 + |\tilde{\lambda}_{21}^i|^2\right) + \Phi(2,1)^2 + \left(|\tilde{\lambda}_{12}^i|^2 + |\tilde{\lambda}_{22}^i|^2\right)\right)}{32}\right) \le$$

$$\frac{1}{2}\exp\left(-\frac{\rho\varphi_i}{32}\right) \le \frac{1}{2}\exp\left(-\frac{\rho \cdot \min\{\delta_1, \delta_2\}}{48}\right)$$

and therefore $$P(d \to \bar{d}) = E[P(d \to \bar{d} \mid \hat{H})] \le \quad (103)$$

$$E\left[\frac{1}{2}\exp\left(-\frac{\rho \cdot \delta_2}{48}\right)\right] Pr\{\delta_1 > \delta_2\} + E\left[\frac{1}{2}\exp\left(-\frac{\rho \cdot \delta_1}{48}\right)\right] Pr\{\delta_1 < \delta_2\}$$

Let $V^1, V^2, V^3$ denote the unitary matrices that come from the singular value decomposition given by equation (31) in the three cases, respectively. Conditioned on $V^1, V^2, V^3$, it can be checked that $$\tilde{\lambda}_{11}^1, \tilde{\lambda}_{21}^1, \tilde{\lambda}_{21}^2, \tilde{\lambda}_{12}^1, \tilde{\lambda}_{22}^1, \tilde{\lambda}_{22}^2$$

are independent and identically distributed complex Gaussian random variables with mean 0 and variance 1. Conditioned on $V^1, V^2, V^3$, it can be checked that $$\tilde{\lambda}_{11}^3, \tilde{\lambda}_{21}^3, \tilde{\lambda}_{11}^2, \tilde{\lambda}_{12}^3, \tilde{\lambda}_{22}^3, \tilde{\lambda}_{12}^2$$

are also independent and identically distributed complex Gaussian random variables with mean 0 and variance 1. Then similar to equation (73), we have $$E\left[\frac{1}{2}\exp\left(-\frac{\rho - \delta_i}{48}\right)\right] = \quad (104)$$

$$E_{V^1, V^2, V^3} \left| E\left[\frac{1}{2}\exp\left(-\frac{\rho \cdot \delta_i}{48}\right)\right] | V^1, V^2, V^3 \right| \le \frac{1}{\prod_{j=1}^{2}[1+(\rho|\phi_j|^2/48)]^3}$$

Substituting equation (104) in equation (103), at high SNRs, we get $$P(d \to \bar{d}) \le \left(\frac{\rho}{48}\right)^{-6} \prod_{j=1}^{2} |\phi_j|^{-6} \quad (105)$$

As a result, the diversity $d \ge 6$. Similarly we can prove that $d \le 6$. Therefore, $d=6$ and we can achieve full diversity for User 1.

Now we prove that we can also achieve full diversity for User 2. First, we use a methodology to decode symbols of User 2 that achieves full diversity although it may not be optimal. Similar to equation (51), when there are three receive antennas, the channel equations can be written as $$\begin{pmatrix} y_1^1 \\ (y_1^2)^* \\ y_2^1 \\ (y_2^2)^* \\ y_3^1 \\ (y_3^2)^* \end{pmatrix} = \sqrt{E_s} \begin{pmatrix} \hat{h}_{11}^1 & \hat{h}_{11}^1 & \hat{g}_{11}^1 & \hat{g}_{11}^1 \\ (\hat{h}_{12}^2)^* & -(\hat{h}_{12}^2)^* & (\hat{g}_{12}^2)^* & (\hat{g}_{12}^2)^* \\ \hat{h}_{21}^1 & \hat{h}_{21}^1 & \hat{g}_{21}^1 & \hat{g}_{21}^1 \\ (\hat{h}_{22}^2)^* & -(\hat{h}_{22}^2)^* & (\hat{g}_{22}^2)^* & -(\hat{g}_{22}^2)^* \\ \hat{h}_{31}^1 & \hat{h}_{31}^1 & \hat{g}_{31}^1 & \hat{g}_{31}^1 \\ (\hat{h}_{32}^2)^* & -(\hat{h}_{32}^2)^* & (\hat{g}_{32}^2)^* & -(\hat{g}_{32}^2)^* \end{pmatrix} \begin{pmatrix} c_1 \\ c_2 \\ s_1 \\ s_2 \end{pmatrix} + \begin{pmatrix} n_1^1 \\ (n_1^2)^* \\ n_2^1 \\ (n_2^2)^* \\ n_3^1 \\ (n_3^2)^* \end{pmatrix} \quad (106)$$

By the method disclosed above, we can detect the signals of User 1 with full diversity. Here we let $$\begin{pmatrix} \hat{c}_1 \\ \hat{c}_2 \end{pmatrix}$$

denote the detected signals of User 1. We subtract the term of $$\begin{pmatrix} \hat{h}_{11}^1 & \hat{h}_{11}^1 \\ (\hat{h}_{12}^2)^* & -(\hat{h}_{12}^2)^* \\ \hat{h}_{21}^1 & \hat{h}_{21}^1 \\ (\hat{h}_{22}^2)^* & -(\hat{h}_{22}^2)^* \\ \hat{h}_{31}^1 & \hat{h}_{31}^1 \\ (\hat{h}_{32}^2)^* & -(\hat{h}_{32}^2)^* \end{pmatrix} \begin{pmatrix} \hat{c}_1 \\ \hat{c}_2 \end{pmatrix}$$

from the channel equation to remove the effect of User 1 and will have $$\begin{pmatrix} y_1^1 \\ (y_1^2)^* \\ y_2^1 \\ (y_2^2)^* \\ y_3^1 \\ (y_3^2)^* \end{pmatrix} - \begin{pmatrix} \hat{h}_{11}^1 & \hat{h}_{11}^1 \\ (\hat{h}_{12}^2)^* & -(\hat{h}_{12}^2)^* \\ \hat{h}_{21}^1 & \hat{h}_{21}^1 \\ (\hat{h}_{22}^2)^* & -(\hat{h}_{22}^2)^* \\ \hat{h}_{31}^1 & \hat{h}_{31}^1 \\ (\hat{h}_{32}^2)^* & -(\hat{h}_{32}^2)^* \end{pmatrix} \begin{pmatrix} \hat{c}_1 \\ \hat{c}_2 \end{pmatrix} = \begin{pmatrix} \hat{g}_{11}^1 & \hat{g}_{11}^1 \\ (\hat{g}_{12}^2)^* & -(\hat{g}_{12}^2)^* \\ \hat{g}_{21}^1 & \hat{g}_{21}^1 \\ (\hat{g}_{22}^2)^* & -(\hat{g}_{22}^2)^* \\ \hat{g}_{31}^1 & \hat{g}_{31}^1 \\ (\hat{g}_{32}^2)^* & -(\hat{g}_{32}^2)^* \end{pmatrix} \begin{pmatrix} s_1 \\ s_2 \end{pmatrix} + \begin{pmatrix} n_{1R}^i \\ n_{2R}^i \\ n_{3R}^i \\ n_{1I}^i \\ n_{2I}^i \\ n_{3I}^i \end{pmatrix} + \sigma \quad (107)$$

where $$\sigma = \begin{pmatrix} \hat{h}_{11}^1 & \hat{h}_{11}^1 \\ (\hat{h}_{12}^2)^* & -(\hat{h}_{12}^2)^* \\ \hat{h}_{21}^1 & \hat{h}_{21}^1 \\ (\hat{h}_{22}^2)^* & -(\hat{h}_{22}^2)^* \\ \hat{h}_{31}^1 & \hat{h}_{31}^1 \\ (\hat{h}_{32}^2)^* & -(\hat{h}_{32}^2)^* \end{pmatrix} \left( \begin{pmatrix} c_1 \\ c_2 \end{pmatrix} - \begin{pmatrix} \hat{c}_1 \\ \hat{c}_2 \end{pmatrix} \right)$$

denotes the residual error. Then we can multiply both sides of the equation (107) by $$\begin{pmatrix} \hat{g}_{11}^1 & \hat{g}_{12}^1 \\ (\hat{g}_{12}^2)^* & -(\hat{g}_{12}^1)^* \\ \hat{g}_{21}^1 & \hat{g}_{21}^1 \\ (\hat{g}_{22}^2)^* & -(\hat{g}_{22}^2)^* \\ \hat{g}_{31}^1 & \hat{g}_{31}^1 \\ (\hat{g}_{32}^2)^* & -(\hat{g}_{32}^2)^* \end{pmatrix}^1$$

and use the same method discussed above to detect the signals of User 2. In what follows, we show that the method provides full diversity to User 2. There are two factors that result in error for User 2. The first one is the fading in the channel of User 2 and the second one is the error in detecting the symbols of User 1, i.e., error propagation. Let $Pr(d_2 \to \bar{d}_2)$ denote the pairwise error probability for User 2, we separate these two events to have $$Pr(d_2 \to \bar{d}_2) = Pr\{d_2 \to \bar{d}_2 | \sigma = 0\} Pr\{\sigma = 0\} + Pr\{d_2 \to \bar{d}_2 | \sigma \neq 0\} Pr\{\sigma \neq 0\} = Pr\{d_2 \to \bar{d}_2 | \sigma = 0\}(1 - Pr\{\sigma \neq 0\}) + Pr\{d_2 \to \bar{d}_2 | \sigma \neq 0\} Pr\{\sigma \neq 0\} \quad (108)$$

Since $Pr(d_2 \to \bar{d}_2 | \sigma \neq 0) \leq 1$, we have $$Pr(d_2 \to \bar{d}_2) \geq Pr\{d_2 \to \bar{d}_2 | \sigma = 0\}(1 - Pr\{\sigma \neq 0\}) + Pr\{\sigma \neq 0\} \quad (109)$$

Note that when $\sigma = 0$, we can follow the steps discussed above to detect the signals of User 2 and by the same technique used above, we can derive $$Pr\{d_2 \to \bar{d}_2 | \sigma = 0\} \leq \left(\frac{p}{32}\right)^{-6} \prod_{j=1}^{2} |\phi'_j|^{-6} = \tau_1 \rho^{-6} \quad (110)$$

where $\tau_1$ is a constant. From equation (105), we know that $$Pr\{\sigma \neq 0\} \leq \tau_2 \rho^{-6} \quad (111)$$

where $\tau_2$ is a constant. Substituting equations (110) and (111) in equation (109), we get $$Pr(d_2 \to \bar{d}_2) \geq (\eta + \eta) \rho^{-6} \quad (112)$$

Using equation (112), it can be shown that the diversity $d \geq 6$. Also we can show that diversity $d \geq 6$. So the diversity for User 2 is 6, i.e., full diversity. Therefore, we can achieve full diversity for both Users 1 and 2 which can also be confirmed by the simulations below.

Note that when we complete the detection of the symbols of User 2, we can remove the effects of User 2 using the detected symbols of User 2 and re-detect the symbols of User 1. Simulation results show that such an iteration improves the coding gain. Finally, a similar antenna selection method at the receiver results in a diversity of N M for a general case of N transmit and M receive antennas.

Simulation

Figure 3:
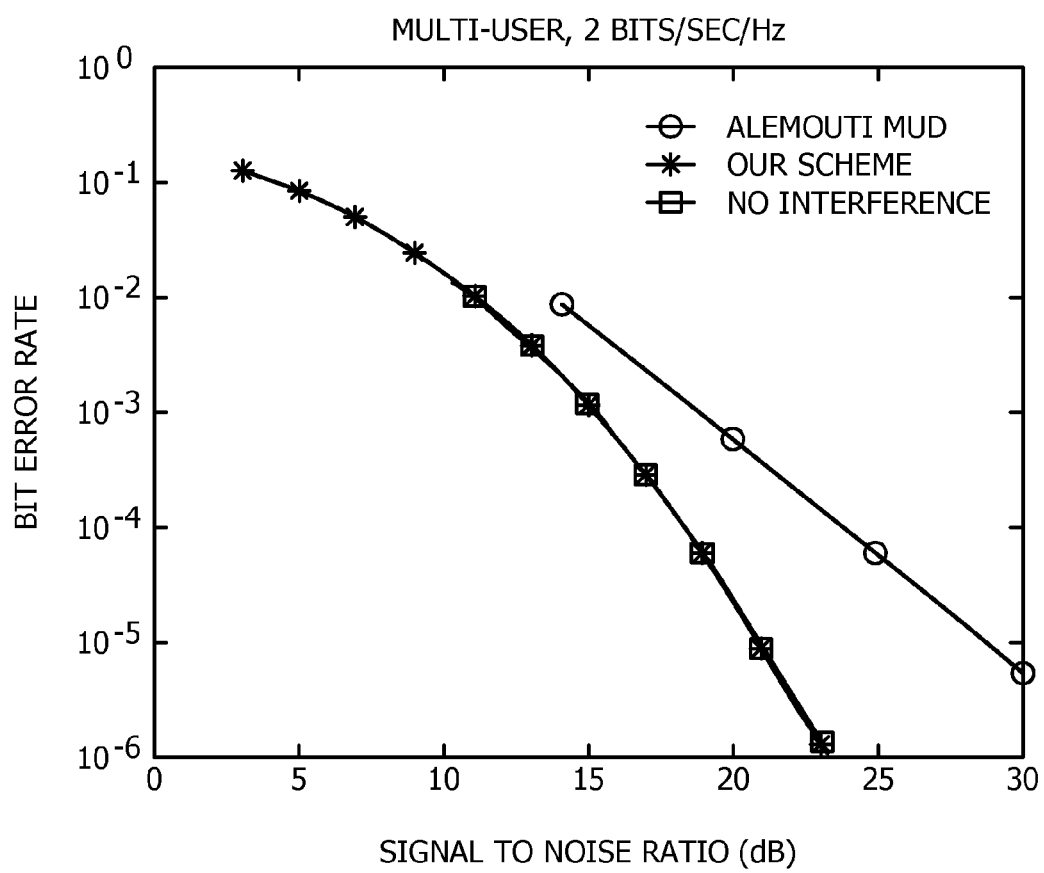
FIG. 3 is a graph comparing the bit error rate as a function of the signal-to-noise ratio of a wireless system devised according to the illustrated embodiments to a prior art system.
Figure 4:
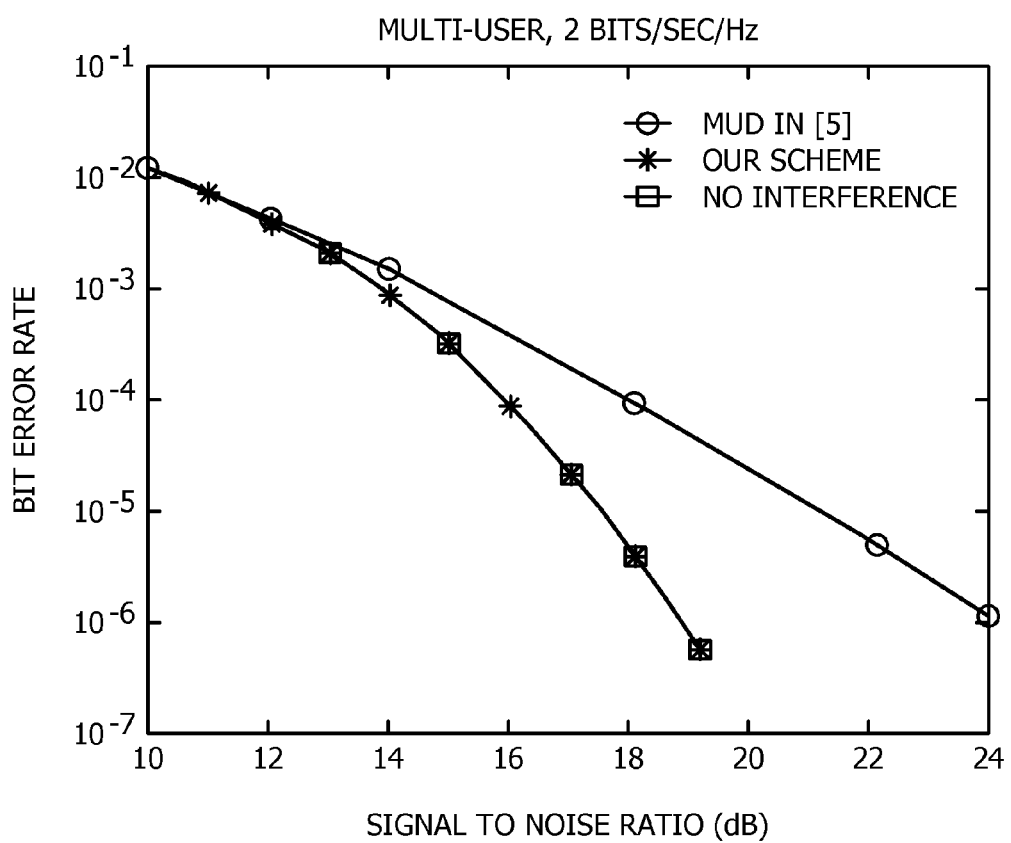
FIG. 4 is a graph comparing the bit error rate as a function of the signal-to-noise ratio of a wireless system devised according to the illustrated embodiments to a prior art system.
Figure 5:
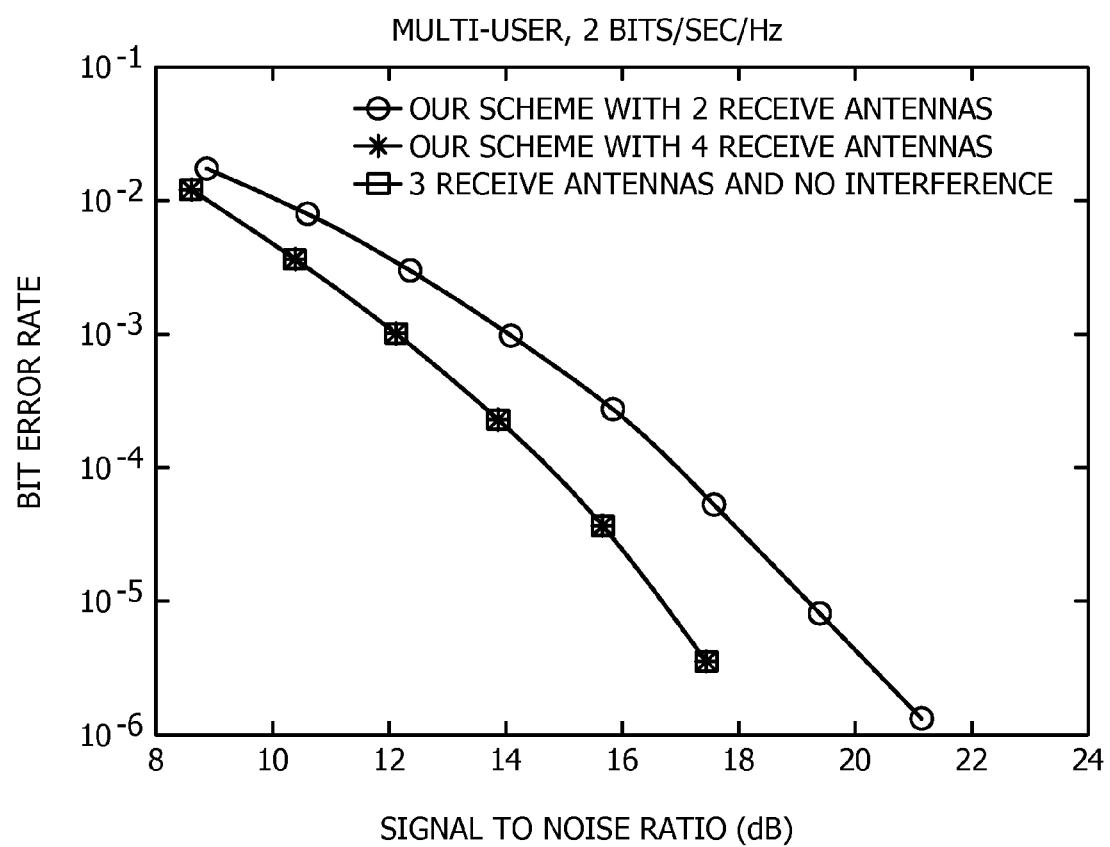
FIG. 5 is a graph comparing the bit error rate as a function of the signal-to-noise ratio of a wireless system devised according to the illustrated embodiments to a prior art system.

Consider now simulation results that confirm our analysis stated above. We assume a quasi-static Rayleigh channel. The performance of our proposed scheme is shown in FIGS. 3, 4 and 5. In each figure, the curves for Users 1 and 2 are identical. In FIG. 3, we consider two users each equipped with two transmit antennas and a receiver with two receive antennas. We compare our results using QPSK with the conventional results in J. Kazemitabar and H. Jafarkhani, "Multiuser interference cancellation and detection for users with more than two transmit antennas:" *IEEE Trans. on Communications*, vol. 56, no, 4, pp. 574-583, April 2008 (hereinafter Kazemitabar) for the same configuration without channel information at the transmitter. With two receive antennas, the multi-user detection (MUD) method offered in Kazemitabar can cancel the interference and provides a diversity of 2. The method of the illustrated embodiment can also cancel the interference completely but provides a diversity of 4 by utilizing the channel information at the transmitter.

We also present the results for system with no interference. This is the same system when User 2 does not exist that can be easily achieved by G=0. Simulation results confirm that we have achieved interference cancellation completely.

Next, we present results for two users each with four transmit antennas and one receiver with two receive antennas in FIG. 4. We compare the performance of our method with the multiuser detection method in Kazemitabar using QOSTBC. As shown in FIG. 4, our scheme can achieve a diversity of 8, i.e., full diversity, by using channel information, while the MUD method using QOSTBC with no. channel information can only achieve a diversity of 4.

Further, we show the results for two users each with two transmit antennas and one receiver with two or three receive antennas in FIG. 5. By increasing the number of receive antennas from two to three, the diversity increases from 4 to 6. Therefore, extra receive antennas will provide extra diversity and the resulting diversity of the system is N M which confirms our theoretical analysis.

In summary, we have considered interference cancellation for a system with two users when users know each other's channels. The goal is to utilize the channel information to cancel the interference without sacrificing the diversity or the complexity of the system. We have disclosed a system to achieve the maximum possible diversity of N M with low complexity for two users each with N transmit antennas and one receiver with M receive antennas. This is the first multiuser detection scheme that achieves full diversity while providing a linear low complexity decoding. The disclosed methodology is directed to designing precoders, using the channel information, to make it possible for different users to transmit over orthogonal spaces. Then, using the orthogonality of the transmitted signals, the receiver can separate them and decode the signals independently. We have analytically proved that the system provides full diversity to both users. In addition, we provide simulation results that confirm our analytical results.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method to achieve full diversity without sacrificing bandwidth and with a linear complexity in a wireless system comprising:
   orthogonally transmitting a plurality of signals utilizing multiple antennas using a corresponding plurality of precoders in a plurality of time slots, which precoders are designed using the channel information to cancel interference among the plurality of signals while achieving a diversity of NM with low complexity for at least two users each having N transmit antennas and one receiver with M receive antennas;
   separating the signals in the receiver using the orthogonality of the transmitted signals; and decoding the signals independently to provide diversity of NM to the at least two users;

where orthogonally transmitting a plurality of signals utilizing multiple antennas using a corresponding plurality of precoders comprises:

determining for each time slot of transmission an equivalent channel equation characterized by a channel matrix $\tilde{H}$ and a noise vector $\tilde{n}$ for the at least two users;

generating an orthogonal structure of signal vectors in corresponding precoders for the at least two users by utilizing a quasi-orthogonal design comprised of a subspace 1 created by the first two columns of matrix $\tilde{H}$ orthogonal to a subspace 2 created by the second two columns of matrix $\tilde{H}$.

2. The method of claim 1 where decoding the signals independently to provide diversity of NM to the at least two users comprises achieving a diversity of at least 4.

3. The method of claim 1 where decoding the signals independently to provide diversity of NM to the at least two users further comprises achieving diversity of NM with low computational complexity for more than two users in the wireless system.

4. The method of claim 1 where decoding the signals independently to provide diversity of NM to the at least two users further comprises achieving diversity while providing a linear low complexity decoding with any number of users.

5. The method of claim 1 where generating an orthogonal structure of signal vectors in corresponding precoders for the at least two users by utilizing a quasi-orthogonal design comprises parameterizing the columns of the channel matrix $\tilde{H}$ using the precoders so that the columns of the channel matrix $\tilde{H}$ form two orthogonal vector subspaces in which signals from the at least two users are transmitted.

6. The method of claim 5 further comprising calculating the parameters used in parameterizing in the precoders using low-complexity algorithms in which a solution for the parameters is reduced to any one of the solutions to a set of linear equations characterizing operation of the precoders, where the solutions of the set of linear equations are nonunique.

7. The method of claim 6 further comprising selecting the precoder parameters by selecting one of the solutions to the set of linear equations characterizing operation of the precoders, which selected solution generates values for the parameters in the channel matrix $\tilde{H}$ which parameters characterize the precoders with a low demand for computation.

8. The method of claim 1 where decoding the signals independently to provide diversity of NM to the at least two users comprises using maximum-likelihood decoding to separately detect real and imaginary portions of the signals from the at least two users.

9. The method of claim 1 where generating an orthogonal structure of signal vectors in corresponding precoders for the at least two users by utilizing a quasi-orthogonal design comprises parameterizing the columns of the channel matrix $\tilde{H}$ using the precoders so that the columns of the channel matrix $\tilde{H}$ form two orthogonal vector subspaces in which signals from the at least two users are transmitted;

calculating the parameters used in parameterizing in the precoders using low-complexity algorithms in which a solution for the parameters is reduced to any one of the solutions to a set of linear equations characterizing operation of the precoders, where the solutions of the set of linear equations are nonunique;

selecting the precoder parameters by selecting one of the solutions to the set of linear equations characterizing operation of the precoders, which selected solution generates values for the parameters in the channel matrix $\tilde{H}$ which parameters characterize the precoders with a low demand for computation; and where decoding the signals independently to provide diversity of NM to the at least two users comprises using maximum-likelihood decoding to separately detect real and imaginary portions of the signals from the at least two users.

10. An apparatus to achieve full diversity without sacrificing bandwidth and with a linear complexity in a wireless system comprising a plurality of orthogonally transmitting users each having N transmit antennas;

at least one receiver having M receive antennas communicating with the plurality of transmitting users, which receiver separates the signals using the orthogonality of the transmitted signals, and decodes the signals independently to provide diversity of NM to the users;

a plurality of precoders corresponding to the plurality of transmitting users, which precoders are designed using the channel information to cancel interference among the plurality of signals while achieving a maximum possible diversity of NM; and where the plurality of transmitting users orthogonally transmit a plurality of signals using the corresponding plurality of precoders in a plurality of time slots and where the plurality of transmitting users orthogonally transmit a plurality of signals utilizing multiple antennas using a corresponding plurality of precoders by determining for each time slot of transmission an equivalent channel equation characterized by a channel matrix $\tilde{H}$ and a noise vector n for the users, generating an orthogonal structure of signal vectors in corresponding precoders for the users by utilizing a quasi-orthogonal design comprised of a subspace 1 created by the first two columns of matrix $\tilde{H}$ orthogonal to a subspace 2 created by the second two columns of matrix H.

11. The apparatus of claim 10 where the receiver decodes the signals independently to provide full diversity to the users achieving a maximum possible diversity of at least 4.

12. The apparatus of claim 10 where the receiver decodes the signals independently to provide full diversity to the users further comprises achieving full diversity while providing a linear low complexity decoding with any number of users.

13. The apparatus of claim 10 where the precoders generating an orthogonal structure of signal vectors in corresponding precoders for the corresponding users by utilizing a quasi-orthogonal design comprises parameterizing the columns of the channel matrix $\tilde{H}$ using the precoders so that the columns of the channel matrix $\tilde{H}$ form two orthogonal vector subspaces in which signals from the users are transmitted.

14. The apparatus of claim 13 further comprising precoders which determine parameters used in parameterizing the columns of the channel matrix $\tilde{H}$ using low-complexity algorithms in which a solution for the parameters is reduced to any one of the solutions to a set of linear equations characterizing operation of the precoders, where the solutions of the set of linear equations are nonunique.

15. The apparatus of claim 14 further comprising precoders which select the precoder parameters by selecting one of the solutions to the set of linear equations characterizing operation of the precoders, which selected solution generates values for the parameters in the channel matrix $\tilde{H}$ which parameters characterize the precoders with a low demand for computation.

16. The apparatus of claim 10 where the receiver decoding the signals independently to provide full diversity to the at least two users comprises using maximum-likelihood decoding to separately detect real and imaginary portions of the signals from the at least two users.

17. The apparatus of claim 10 where the precoders generating an orthogonal structure of signal vectors in corresponding precoders for the corresponding users by utilizing a quasi-orthogonal design comprises parameterizing the columns of the channel matrix $\tilde{H}$ using the precoders so that the columns of the channel matrix $\tilde{H}$ form two orthogonal vector subspaces in which signals from the users are transmitted;
  where the precoders determine parameters used in parameterizing the columns of the channel matrix $\tilde{H}$ using low-complexity algorithms in which a solution for the parameters is reduced to any one of the solutions to a set of linear equations characterizing operation of the precoders, where the solutions of the set of linear equations are nonunique;
  where the precoders select the precoder parameters by selecting one of the solutions to the set of linear equations characterizing operation of the precoders, which selected solution generates values for the parameters in the channel matrix $\tilde{H}$ which parameters characterize the precoders with a low demand for computation; and
  where the receiver decoding the signals independently to provide full diversity to the at least two users comprises using maximum-likelihood decoding to separately detect real and imaginary portions of the signals from the at least two users.

18. Signal processing instructions recorded within memory components of a communication system for controlling a plurality of orthogonally transmitting users each having N transmit antennas, at least one receiver having M receive antennas communicating with the plurality of transmitting users, which receiver separates the signals using the orthogonality of the transmitted signals, and decodes the signals independently to provide diversity of NM to the users, a plurality of precoders corresponding to the plurality of transmitting users, which precoders are designed using the channel information to cancel interference among the plurality of signals while achieving a diversity of NM, where the plurality of transmitting users orthogonally transmit a plurality of signals using the corresponding plurality of precoders in a plurality of time slots, and where the plurality of transmitting users orthogonally transmit a plurality of signals utilizing multiple antennas using a corresponding plurality of precoders by determining for each time slot of transmission an equivalent channel equation characterized by a channel matrix $\tilde{H}$ and a noise vector n for the users, generating an orthogonal structure of signal vectors in corresponding precoders for the users by utilizing a quasi-orthogonal design comprised of a subspace 1 created by the first two columns of matrix $\tilde{H}$ orthogonal to a subspace 2 created by the second two columns of matrix $\tilde{H}$.

* * * * *